(12) United States Patent
Gorbachov

(10) Patent No.: US 8,649,739 B2
(45) Date of Patent: Feb. 11, 2014

(54) INCREASED RECEIVE SENSITIVITY RADIO FREQUENCY FRONT END INTEGRATED CIRCUITS

(75) Inventor: Oleksandr Gorbachov, Irvine, CA (US)

(73) Assignee: Rfaxis, Inc., Irvine, CA (US)

( * ) Notice: Subject to any disclaimer, the term of this patent is extended or adjusted under 35 U.S.C. 154(b) by 584 days.

(21) Appl. No.: 12/980,794

(22) Filed: Dec. 29, 2010

(65) Prior Publication Data

US 2011/0165849 A1 Jul. 7, 2011

Related U.S. Application Data

(60) Provisional application No. 61/292,676, filed on Jan. 6, 2010.

(51) Int. Cl.
*H04B 1/44* (2006.01)
(52) U.S. Cl.
USPC .............................. 455/83; 455/73
(58) Field of Classification Search
USPC ............ 455/73, 78, 83, 41.2; 375/219
See application file for complete search history.

(56) References Cited

U.S. PATENT DOCUMENTS

| | | | |
|---|---|---|---|
| 6,108,313 | A | 8/2000 | Lee et al. |
| 6,882,829 | B2 * | 4/2005 | Mostov et al. ................. 455/83 |
| 6,977,552 | B2 | 12/2005 | Macedo |
| 7,197,284 | B2 * | 3/2007 | Brandt et al. .................. 455/78 |
| 7,315,730 | B2 | 1/2008 | Galan |
| 2004/0152426 | A1 * | 8/2004 | Suzuki et al. .................. 455/83 |
| 2005/0107043 | A1 * | 5/2005 | Avasarala et al. .............. 455/78 |
| 2007/0232241 | A1 * | 10/2007 | Carley et al. ................... 455/83 |
| 2008/0089252 | A1 | 4/2008 | Choi |
| 2008/0279262 | A1 * | 11/2008 | Shanjani ...................... 375/219 |
| 2009/0029654 | A1 * | 1/2009 | Fu et al. ........................ 455/83 |
| 2009/0036065 | A1 * | 2/2009 | Siu ................................ 455/78 |
| 2009/0253373 | A1 * | 10/2009 | Gorbachov .................. 455/41.2 |

FOREIGN PATENT DOCUMENTS

EP 0241265 A1 * 10/1987
WO 2008/002697 3/2008

OTHER PUBLICATIONS

Maxim: Industry's First Ultra-Low-Power, 802.11g/b RF Transceiver to Integrate PA, Rx/Tx/Antenna Diversity Switches, and Crystal Oscillator Circuitry; Apr. 30, 2008; 2 pages.
Maxim: MAX2830 Industry's First802.11G/B RF Transceiver with Integrated PA, Rx/Tx and Antenna Switches; Apr. 30, 2008; 3 pages.

(Continued)

*Primary Examiner* — Lewis West
(74) *Attorney, Agent, or Firm* — Stetina Brunda Garred & Brucker

(57) ABSTRACT

A front end circuit for coupling an antenna to a radio frequency (RF) transceiver is disclosed. An antenna port connectible to the antenna is provided, as well as a power amplifier coupled to a signal output of the RF transceiver and a low noise amplifier coupled to the signal input of the RF transceiver. The front end circuit includes a switching network that is connected to the antenna port, the power amplifier, and the low noise amplifier. Additionally, there is at least one resonant circuit and a control circuit coupled to a receive enable line of the transceiver. This resonant circuit defines a parallel resonance with a first resonant resistance in the operating frequency band upon activation in the receive mode. The resonant circuit also defines a substantially high transistor impedance upon deactivation in the transmit mode.

18 Claims, 19 Drawing Sheets

(56) References Cited

OTHER PUBLICATIONS

Meshnetics: ZigBit Amp OEM Modules; ZDM-A1281-PN/PNO (MNZG-A24-UFL/UO) Revision 2.2; Ultra-Compact 2.4GHz 802.15.4/ZigBee Modules with Power Amplifier for Wireless Networking Applications; Oct. 2008, 18 pages.
Meshnetics M2M-100-2008: ZigBit Amp Module; 2.4 GHz Amplified Modules for IEEE 802.15.4/ZigBee Wireless Mesh Networking Applications; 2 pages.
Meshnetics: ZigBit Amp OEM Modules ZDM-A1281-PN/PNO Revision 2.1; Ultra-Compact 2.4GHz 802.15.4/ZigBee Modules with Power Amplifier for Wireless Networking Applications; Dec. 2007, 15 pages.
Murata MF2400PJ-SF0702; PA MMIC for 2.4GHz Wireless Communication; Jan. 18, 2003; 11 pages.
CEL California Eastern Laboratories: Class 1 Power Amplifiers for Bluetooth; 1 page.
CEL; GaAs Integrated Circuit PG2250T5N; 1.8 V, Power Amplifier for Bluetooth Class 1; NEC Electronics Corp.; 2006, 12 pages.
CEL NEC's Power Amplifier for Bluetooth Class 1: UPG2301TQ Data Sheet; Feb. 4, 2004; 7 pages.
CEL: GaAs HBT Integrated Circuit PG2314T5N: Power Amplifier for Bluetooth Class 1; Jul. 2006, 10 pages.
CEL Application Note: AN1048 UPG2150T5L Switch; Sep. 29, 2005, 1 page.
WLAN WiMAX PA & FEM Market, Feb. 12, 2009; 158 page presentation.
Cirronet ZigBee High Power Module ZMN2405HP; Oct. 28, 2007; 6 pages.
Cirronet ZigBee High Power Module ZMN2430HP; Oct. 28, 2007; 6 pages.
Cirronet ZigBee Matching RF power performance to ZigBee apps—Electronic Products; 4 pages; http://www2.electronicproducts.com/PrintArticle.aspx?ArticleURL=cirronet.feb2006.html.
Design of a Dual Band Wireless LAN SiGe-Bipolar Power Amplifier; from Sep. 2004 High Frequency Electronics; 8 pages.
EPCOS WLAN Modules Preliminary Datasheet R041_M01; Jun. 20, 2006; 14 pages.
Ember Datasheet; EM2420 2.4 GHz IEEE 802.15.4 / ZigBee RF Transceiver; Copyright 2003, 2004 by Ember Corporation; 89 pages.
Free2Move Class 1 Bluetooth Module—F2M03C1 Datasheet; Rev. 13 Sep. 2005; 46 pages.
Freescale Semiconductor Technical Data Document No. MC13191/D; Rev. 1.2 Apr. 2005; MC13191: 2.4 GHz ISM Band Low Power Transceiver; 24 pages.
Freescale Semiconductor Technical Data Document No. MC13192; Rev. 3.2 May 2007; MC13192: 2.4 GHz Low Power Transceiver for the IEEE 802.15.4 Standard; 24 pages.
Freescale Semiconductor; MC13191: 2.4 GHz Low Power Transceiver for the IEEE 802.15.4 Standard; Reference Manual; Document No. MC13191RM; Rev. 1.2; Apr. 2005; 92 pages.
Freescale Semiconductor Technical Data; Document No. MC13192; Rev. 2.8, Apr. 2005; MC13192/MC13193: 2.4 GHz Low Power Transceiver for the IEEE 802.15.4 Standard; 23 pages.
Freescale Semiconductor MC13192/MC13193: 2.4 GHz Low Power Transceiver for the IEEE 802.15.4 Standard; Reference Manual; Rev. 1.3 Apr. 2005; 111 pages.
California Eastern Laboratories: FreeStar ZFSM-100 Series ZigBee-Ready Modules; May 2008; 1 page.
CEL Preliminary Data Sheet; Apex & Apex LT Series Transceiver Modules; ZAXM-201-1, ZALM-301-1; May 7, 2008; 17 pages.
CEL Preliminary Data Sheet; Freestar Series Transceiver Module; ZFSM-101-1; May 7, 2008; 10 pages.
CEL Preliminary Data Sheet; Matrix Transceiver Modules; ZMXM-400 Series; May 7, 2008; 12.
J. Trachewsky, et al.; Broadcom WLAN Chipset for 802.11a/b/g; Broadcom Corporation, CA, USA; Aug. 17, 2003; 42 pages.
Anadigics; AWL6254; 1.4 GHz 802.11b/g/n; WLAN PA, LNA, and RF Switch Data Sheet—Rev 2.0; Feb. 2008; 16 pages.
Anadigics; AWM6430; 3.3-3.6 GHz Power Amplifier Module; Preliminary Data Sheet; Rev 1.0; Jan. 2006; 12 pages.
Zhang, Weimin; A Low Voltage Fully-Integrated 0.18um CMOS Power Amplifier for 5GHz WLAN; Institute of Microelectronics, Singapore; 2002; 4 pages.
Atheros AR3011—ROCm Solutions for Bluetooth; Radio-On-Chip for Mobile (ROCm) Products; Jan. 22, 2008; 2 pages.
Atheros AR3000—ROCm Solutions for Bluetooth Radio-On-Chip for Mobile (ROCm) Products; Jan. 22, 2008; AR3031; 2 pages.
Atheros ROCm Platform; Radio-On-Chip for Mobile (ROCm; AR6001GL; Embedded 802.11b/g Solution for Mobile and Battery-Operated Devices; 2006; 2 pages.
AR6002 Breaking the Power Barrier in Mobile WiFi; Aug. 28, 2008; 2 pages.
AR6001GL; Embedded 802.11b/g Solution for Mobile and Battery-Operated Devices; 2006; 2 pages.
AR6001XL; Embedded 802.11a/b/g Solution for Mobile and Battery-Operated Devices; 2006; 2 pages.
AR6101G; World's Most Integrated, Cost-Effective Single-Chip WLAN Handset Design Brings Voice-Over-WiFi to the Mainstream; 2006; 2 pages.
AR9285 Single-chip PCIe based on 802.11n 1-stream specification; Oct. 28, 2008; 2 pages.
AR9002AP-1S; AP/Router solution based on 802.11n 1-stream specification; Oct. 28, 2008; 2 pages.
SiGe PA Enables Smallest System Footprint for Embedded WLAN; Semiconductor Online; Dec. 15, 2008; 3 pages.
Skyworks: SKY65336: 2.4 GHz Transmit/Receive Front-End Module with Integrated LNA; Skyworks Solutions, Inc.; Aug. 20, 2008; 2 pages.
Skyworks; SKY65337: 2.4 GHz Transmit/Receive Front-End Module; Skyworks Solutions, Inc.; Aug. 20, 2008; 2 pages.
Skyworks; SKY65241-12: WLAN 802.11a, b, g, n Dual-Band Intera Front-End Module Single Antenna; Skyworks Solutions, Inc.; Mar. 12, 2008; 9 pages.
Skyworks; SKY65243-11: WLAN 802.11a, b, g, n Dual-Band Intera Front-End Module Dual Antennas; Skyworks Solutions, Inc.; Mar. 12, 2008; 8 pages.
Skyworks; SKY65256-11: WLAN 802.11a, b, g, n Dual-Band Front-End Module Single Antenna; Skyworks Solutions, Inc.; Sep. 28, 2007; 10 pages.
Skyworks; SKY65228-11: WLAN 802.11n Single Band 4.9-5.85 GHz MIMO Intera Front-End Module; Skyworks Solutions, Inc.; Oct. 9, 2007; 9 pages.
Skyworks; SKY65206-13: WLAN 802.11b/g Intera Front-End Module; Skyworks Solutions, Inc.; Aug. 21, 2007; 7 pages.
Skyworks; SKY65249-11: WLAN 802.11b, g, n Intera Front-End Module; Skyworks Solutions, Inc.; Nov. 30, 2007; 9 pages.
Skyworks; SKY65227-11: WLAN 802.11n Single Band Intera 2.4 GHz MIMO Intera Front-End Module; Skyworks Solutions, Inc.; Oct. 9, 2007; 9 pages.
Skyworks; SKY65230-11: WLAN 802.11 n 2×2 MIMO Intera Front-End Module with 3 Antenna Ports; Skyworks Solutions, Inc.; Oct. 9, 2007; 13 pages.
Skyworks; SKY65225-11: WLAN 802.11n 2×2 MIMO Intera Front-End Module; Skyworks Solutions; Inc.; May 7, 2007; 11 pages.
Skyworks; SKY65135: WLAN Power Amplifier; Skyworks Solutions, Inc.; Mar. 26, 2007; 13 pages.
Skyworks; SKY65209: WLAN 802.11b/g Front-End Module ; Skyworks Solutions, Inc.; Jan. 18, 2006; 8 pages.
4.9-5.8 GHz High-Linearity Power Amplifier SST11LP11; SST Communications Corp; 2005, 14 pages.
4.9-5.8 GHz High-Linearity Power Amplifier SST11LP12; SST Communications Corp; 2005, 14 pages.
2.4 GHz Power Amplifier SST12LP00; SST Communications Corp; 2005, 9 pages.
2.4 GHz High-Linearity Power Amplifier SST12LP10; SST Communications Corp; 2005, 12 pages.
2.4 GHz Amplifier SST12LP14; SST Communications Corp; 2005, 12 pages.
2.4 GHz High-Power, High-Gain Amplifier SST12LP15; SST Communications Corp; 2005, 12 pages.

(56) References Cited

OTHER PUBLICATIONS 2.4 GHz High-Power, High-Gain Amplifier SST12LP15A; SST Communications Corp; 2005, 12 pages.
STLC2500C: Bluetooth EDR Single Chip Data Brief; STMicroelectronics; Jan. 2006, 4 pages.
STLC4550: Single Chip 802.11b/g WLAN radio Data Brief; STMicroelectronics; Feb. 2006, 5 pages.
ZigBee—compliant wireless control and sensoring network solutions; STMicroelectronics; Jun. 2006; 8 pages.
Texas Instruments: CC2591; 2.4-GHz RF Front End, data sheet, Jun. 2008, Texas Instruments, Inc. 18 pages.
Texas Instruments: CC2436; High-Power Dual-Band (2.4-GHz and 4.9-GHz to 5.9-GHz) RF Front End, data sheet, May 2007; Texas Instruments, Inc. 15 pages.
Texas Instruments: Technology for Innovators: WiLink 4.0 single-chip mobile WLAN solutons Product Bulletin; 2006 Texas Instruments Inc., 2 pages.
Chipcon Products from Texas Instruments: CC2420; 2.4 GHz IEEE 802.15.4 / ZigBee-ready RF Transceiver; 2008, Texas Instruments Inc., 89 pages.
Chipcon Products from Texas Instruments: CC2430; A True System-on-Chip solution for 2.4 GHz IEEE 802.15.4 / ZigBee; 2007, Texas Instruments Inc., 212 pages.
Texas Instruments: CC2520 Datasheet; 2.4 GHz IEEE 802.15.4/ SIZBEE RF Transceiver; Dec. 2007; Texas Instruments Inc.; 2007; 128 pages.
Zheng, Shaoyong, et al.; Distributed Power Amplifier/Feedback Low Noise Amplifier Switch-Less Front-End; Dept. Electronic Engineering, City University of Hong Kong, Feb. 8, 2006, p. 1659-1662.
Masse, Cecile; Analog/RF Front End; A direct-conversion transmitter for WiMAX and WiBro applications; www.rfdesign.com ; Jan. 2006, 3 pages.
RFMD: Mobile Computing: Front End Module Portfolio; rfmd.com; 2009, 2 pages.
Maxim: Application Note 686; QPSK Modulation Demystified; May 1, 2002, 7 pages.
Atmel: Bluetooth Front-end IC T7024 Design Guide; Jun. 2004; 18 pages.
Atmel: Integrated SiGe Front-end RF ICs;2003, 2 pages.
Atmel: 5-GHz WLAN Power Amplifier for 802.11a, ATR3515 Preliminary; 2004, 7 pages.
Atmel: High Gain Power Amplifier for 802.11b/g WLAN Systems, ATR7032 Preliminary; 2006, 15 pages.
Atmel: ZigBee IEEE 802.15.4 Radio Transceiver; AT86RF230, Preliminary; 2007, 82 pages.
Anadigics: AWM6430; 3.5 GHz WiMAX Power Amplifier Module, Advanced Product Information—Rev. 0.1; Jan. 2005; 12 pages.
Broadcom; BCM4328 Product Brief; Air Force One Single-Chip IEEE 802.11a/b/g MAC/Baseband/Radio With Integrated CPU; Dec. 5, 2006; 2 pages.
Broadcom; BCM4326 Product Brief; Air Force One Single-Chip IEEE 802.11b/g MAC/Baseband/Radio With Integrated CPU; Dec. 5, 2006; 2 pages.
Broadcom: BCM94318 Product Brief: Airforce One Chip 802.11 Reference Design; Oct. 7, 2004; 2 pages.
Xin He, Fully Integrated Transceiver Design in SOI Processes, a Dissertation, Kansas State University, 2004, 129 pages.
CEL California Eastern Laboratories: AN1049 UPG2314T5N HBT PA IC for Bluetooth and ZigBee; Oct. 17, 2006; 5 pages.
RT2501 Wireless Chipset 802.11 b/g solution featuring Packet-Overdirve Technology; Ralink Technology Corp; 2006, 1 page.
RT2501U; USB2.0 Wireless Chipset 802.11 b/g solution featuring Packet-Overdirve Technology; Ralink Technology Corp., 2006, 1 page.
RT2600 MIMO XR Wirless Chipset 802.11b/g solution featuring Packet-Overdrive and Range-Overdirve Technologies; Ralink Technology Corp; 2006, 1 page.
RT2700 MIMO Wireless Chipset Family; 802.11n Solution featuring MIMObility Technology; Ralink Technology Corp; 2006, 2 pages.
RT2800 MIMO Wireless Chipset Family 802.11n Solution featuring MIMObility Technology; Ralink Technology Corp; 2006, 2 pages.
RT5201 Wireless Chipset 802.11 a/b/g solution featuring Packet-Overdirve Technology; Ralink Technology Corp; 2006, 1 page.
RT5201U USB 2.0 Wireless Chipset 802.11 a/b/g solution featuring Packet-Overdirve Technology; Ralink Technology Corp; 2006, 1 page.
RT5600 MIMO XR Wireless Chipset 802.11 a/b/g solution featuring Packet-Overdirve and Range-Overdirve Technologies; Ralink Technology Corp; 2006, 1 page.
Agnelli, Federico, et al; Wireless Multi-Standard Terminals: System Analysis and Design of a Reconfigurable RF Front-end; IEEE Circuits and Systems Magazine; First Quarter 2006; p. 38-59.
Cutler, Tim; ZigBee: RF power options in ZigBee solutions; Emerging Wireless Technology/A Supplement to RF Design; www.rfdesign.com; Mar. 2006; p. 18-21.
RFMD SiW1722B: Bluetooth Transceiver Solution for CDMA and WCDMA Mobile Phones; rfmd.com; Oct. 2006; 2 pages.
Richwave RTC6682 VO.3 Data Sheet Aug. 2006; www.richwave.com.tw; 7 pages.

* cited by examiner

INCREASED RECEIVE SENSITIVITY RADIO FREQUENCY FRONT END INTEGRATED CIRCUITS

CROSS-REFERENCE TO RELATED APPLICATIONS

This application relates to and claims the benefit of U.S. Provisional Application No. 61/292,676, filed Jan. 6, 2010 and entitled TRANSMIT-RECEIVE RF FRONT-END IC CIRCUITS WITH INCREASED RX SENSITIVITY, which is wholly incorporated by reference herein.

STATEMENT RE: FEDERALLY SPONSORED RESEARCH/DEVELOPMENT

Not Applicable

BACKGROUND

1. Technical Field

The present invention relates generally to radio frequency (RF) signal circuitry, and more particularly, to transmit-receive RF front end integrated circuits with increased receive sensitivity.

2. Related Art

Wireless communications systems find application in numerous contexts involving information transfer over long and short distances alike, and there exists a wide range of modalities suited to meet the particular needs of each. These systems include cellular telephones and two-way radios for distant voice communications, as well as shorter-range data networks for computer systems, among many others. Generally, wireless communications involve a radio frequency (RF) carrier signal that is variously modulated to represent data, and the modulation, transmission, receipt, and demodulation of the signal conform to a set of standards for coordination of the same. For wireless data networks, such standards include Wireless LAN (IEEE 802.11x), Bluetooth (IEEE 802.15.1), and ZigBee (IEEE 802.15.4), which are understood to be time domain duplex systems where a bi-directional link is emulated on a time-divided single communications channel.

A fundamental component of any wireless communications system is the transceiver, that is, the combined transmitter and receiver circuitry. The transceiver, with its digital baseband subsystem, encodes the digital data to a baseband signal and modulates the baseband signal with an RF carrier signal. The modulation utilized for WLAN, Bluetooth and ZigBee include orthogonal frequency division multiplexing (OFDM), quadrature phase shift keying (QPSK), and quadrature amplitude modulation (16QAM, 64QAM). Upon receipt, the transceiver down-converts the RF signal, demodulates the baseband signal, and decodes the digital data represented by the baseband signal. An antenna connected to the transceiver converts the electrical signal to electromagnetic waves, and vice versa.

Conventional wireless communication transceivers typically do not generate sufficient power or have sufficient sensitivity necessary for reliable communications. Accordingly, circuitry between the transceivers and the antenna referred to as the front-end module are utilized. The front-end module includes a power amplifier for increased transmission power, and/or a low noise amplifier for increased reception sensitivity. In most cases, wireless communication devices utilized in time domain duplex (TDD) systems utilized a single antenna, so the front end circuit had switch circuitry to rapidly toggle between transmit and receive functions, which included activating and deactivating the power amplifier and the low noise amplifier. Such control was possible via the enable line output from the transceiver, which may also have varying voltages to control gain or setting the bias current of the transistors in the amplifier circuitry.

Typical RF switch circuits were single pole, double throw switches, though subsequent RF front end circuits such as those disclosed by the present inventor in U.S. Pat. App. Pub. No. 2010/0203844 entitled "Radio Frequency Transceiver Front End Circuit" eliminated the RF switch. In general, such front end circuits utilize a matching network with a first port connected to the power amplifier, a second port connected to the low noise amplifier, and a third port connected to the antenna. With this matching network instead of the RF switch, it became possible to fabricate the front end circuit on a single semiconductor substrate.

In some embodiments, the matching network was configured such that a resistive component of an input impedance of the activated low noise amplifier was substantially equivalent to a resistive component of an output impedance required for the activated power amplifier. With communication systems that require substantially higher transmit power in relation to received signals such as WiMAX (IEEE 802.16), however, the receive chain of the front end circuit tended to exhibit increase noise figures. In particular, with higher transmit power levels, it is necessary for the output impedance at the power amplifier to be lower (i.e. below 5 Ohms). This is understood to result in a higher transformation coefficient from the antenna to the low noise amplifier input, and corresponding resistive losses that are associated with the matching network. Accordingly, there is a need in the art for transmit-receive RF front end integrated circuits with increased receive sensitivity.

BRIEF SUMMARY

In accordance with various embodiments of the present disclosure, a front end circuit for coupling an antenna to a radio frequency (RF) transceiver is contemplated. The RF transceiver has a defined operating frequency band, as well as a signal input, a signal output, a receive enable line activated during a receive mode and transmit enable line activated during a transmit mode. The front end circuit may include an antenna port connectible to the antenna. Additionally, the front end circuit may include a power amplifier that is coupled to the signal output of the RF transceiver. The power amplifier may include a transmit control circuit coupled to the transmit enable line of the RF transceiver. Furthermore, the front end circuit may include a low noise amplifier that is coupled to the signal input of the RF transceiver. The low noise amplifier may likewise include a receive control circuit coupled to the receive enable line of the RF transceiver. There may also be a switching network that is connected to the antenna port, the power amplifier, and the low noise amplifier. The switching network may include at least one resonant circuit and a control circuit coupled to the receive enable line of the transceiver. This resonant circuit may define a parallel resonance with a first resonant resistance in the operating frequency band upon activation in the receive mode. The resonant circuit may also define a substantially high transistor impedance upon deactivation in the transmit mode.

The present disclosure contemplates the independent configuration of the transmit chain based upon its linearity requirements, as well as the independent configuration of the receive chain based upon its noise figure requirements. In particular, the resistive part of impedance of the power amplifier output matching is not tied to the resistive part of the low noise amplifier base-emitter impedance. The power amplifier output matching circuit is understood to require smaller resistances due to the increased power levels, and the low noise amplifier input matching circuit can have a higher input impedance. Accordingly, the overall loss of the low noise amplifier input matching circuit is minimized with a resulting improvement in the overall noise figure. The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of the presently preferred embodiment of the invention, and is not intended to represent the only form in which the present invention may be developed or utilized. The description sets forth the functions of the invention in connection with the illustrated embodiment. It is to be understood, however, that the same or equivalent functions may be accomplished by different embodiments that are also intended to be encompassed within the scope of the invention. It is further understood that the use of relational terms such as first and second and the like are used solely to distinguish one from another entity without necessarily requiring or implying any actual such relationship or order between such entities. The present application relates to co-pending U.S. patent application Ser. No. 12/412,226 entitled "Radio Frequency Transceiver Front End Circuit" filed Mar. 26, 2009, the disclosure of which is expressly incorporated by reference herein.

Figure 1:
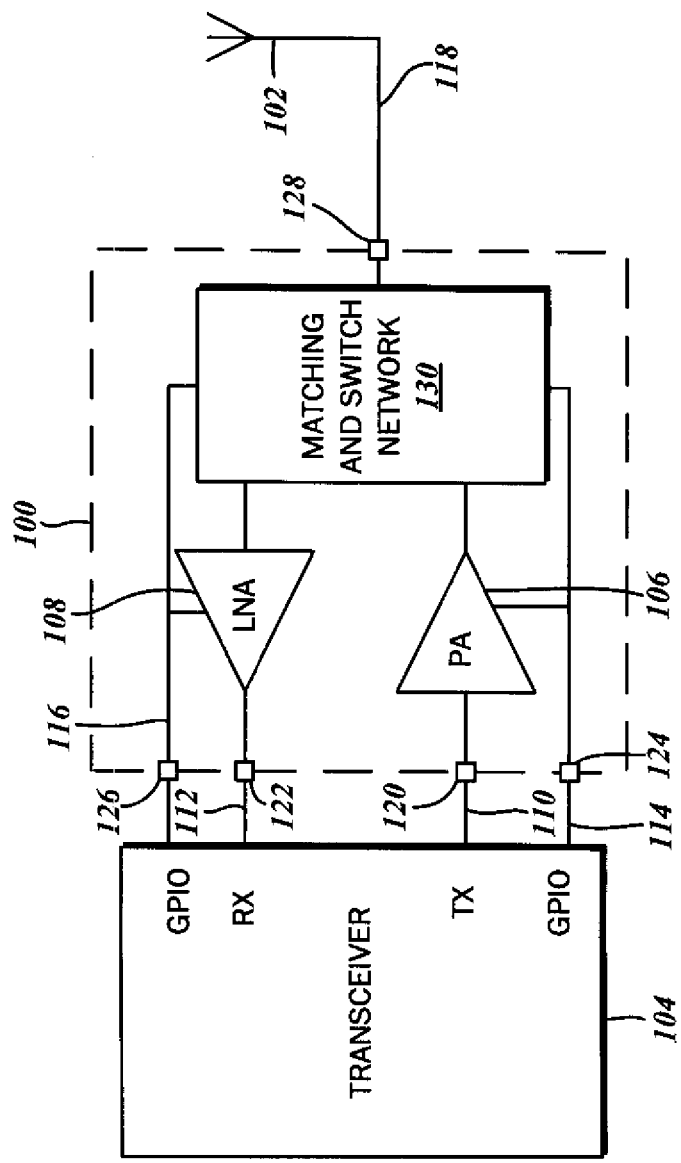
FIG. 1 is a block diagram of an exemplary front end circuit for a radio frequency transceiver with separate transmit and receive lines.

Referring to the block diagram of FIG. 1, various embodiments of the present disclosure contemplate a front end circuit 100 that couples an antenna 102 to a wireless transceiver 104. The transceiver 104 may be configured for any communications standard such as Wireless LAN (802.11x), though as indicated above, the features of the front end circuit 100 disclosed herein may be suitable for WiMAX and the like where a substantially high transmit power is required. As will be described in further detail below, the front end circuit 100 minimizes the noise figure in the receive chain in such applications. In general, the transceiver 104 generates and receives an RF signal compliant with the communications standard for which it is configured, and accordingly defines an operating frequency band within which the various components including the transceiver 104 and the front end circuit 100 operate.

The RF signal generated by the transceiver 104 is understood to be insufficient for transmission over anything but the shortest distances. To increase the power to a level suitable for establishing a reliable communications link, the front end circuit 100 includes a power amplifier 106. Additionally, the transceiver 104 receives an RF signal at the antenna 102 from a corresponding transmitting node. In order for the transceiver 104 to properly demodulate and extract useful information content carried on the weak and noisy RF signal at the antenna 102, it is amplified by a low noise amplifier 108. To this end, the transceiver 104 has a transmit line 110 and a receive line 112, as well as a transmit enable line 114 and a receive enable line 116. In some embodiments, the transmit enable line 114 and the receive enable line 116 are general purpose input/output lines that supply digital signals at predefined voltages for a high/on state and a low/off stage, though it is also understood that variable analog voltages may also be supplied. The front end circuit 100 includes a transmit port 120 connectible to the transmit line 110, a receive port 122 connectible to the receive line 112, a transmit enable port 124 connectible to the transmit enable line 114, and a receive enable port 126 connectible to the receive enable line 116. Furthermore, the front end circuit 100 includes an antenna port 128 connectible to the antenna line 118.

In accordance with various embodiments, the elimination of the conventional RF switch from the front end circuit 100 is generally contemplated. Consequently, all or substantially all of the components of the front end circuit 100 are envisioned to be fabricated on a single die with common transistors structures, though some embodiments are not necessarily limited thereto, in which the components may be discretely fabricated. Suitable transistor structures include bipolar junction (BJT), hetero-junction bipolar (HBT), metal semiconductor field effect (MESFET), metal-oxide semiconductor field effect (MOSFET), and high electron mobility (HEMT). The single-die fabrication is understood to greatly reduce the footprint of the die for the front end circuit 100. The die may be fabricated from a silicon substrate, a gallium arsenide (GaAs) substrate, or any other suitable semiconductor material, and may be packaged in a conventional, low-cost quad frame no lead (QFN) plastic package. Any other appropriate transistor structure, semiconductor substrate, fabrication techniques, and packaging techniques may also be utilized in accordance with various teachings in the art in light of the performance parameters of the front end circuit 100.

Time domain duplex communications systems such as WiMAX require rapidly switching between transmit and receive modes, and instead of an RF switch, the inherent switching characteristics of the power amplifier 106 and the low noise amplifier 108 are utilized. Thus, the front end circuit 100 in accordance with the various embodiments have similar functional features as conventional front end modules with RF switches, with the benefit of reduced control lines. In particular, the low noise amplifier 108 and the power amplifier 106 are selectively activated in a substantially exclusive relation to the other. When the transmit line 110 is active, the power amplifier 106 is activated, while the low noise amplifier 108 is deactivated. The RF signal generated by the transceiver 104 is amplified and transmitted over the antenna 102. When the receive line 112 is active, the low noise amplifier 108 is activated, while the power amplifier 106 is deactivated. Thus, the RF signal received through the antenna 102 is amplified and conveyed to the transceiver 104 for further processing.

Since both the transmit chain and the receive chain share a single connection 118 to the antenna 102 via the front end circuit 100, in an optimal configuration, the amplified RF signal at the output of the power amplifier 106 is minimized at the receive line 112, and the received RF signal at the input of the low noise amplifier 108 is non-existent at the transmit line 110. As utilized herein, the terms transmit chain and receive chain are understood to refer to the interconnected components of the front end circuit 100 and the transceiver 104 that relate to the transmission or broadcast, and reception, respectively, of the RF signal. Some components, such as the antenna 102, are understood to be part of both the transmit chain and the receive chain, while other components such as the power amplifier 106 or the low noise amplifier 108 are understood to be exclusive to the transmit chain and the receive chain, respectively. Without suitable isolation between the transmit chain and the receive chain of the front end circuit 100, particularly with high output power levels from the power amplifier 106, leakage of the transmitted RF signal into the receive chain may cause distortion of the same. Furthermore, a reverse voltage at the low noise amplifier 108 with a high power RF signal may exceed reliable operation parameters, potentially leading to permanent breakdown. Along these lines, the deactivated power amplifier 106 and the deactivated low noise amplifier 108 is understood to exert a minimal influence on the remainder of the front end circuit 100.

In addition to such isolation considerations of the transmit chain and the receive chain, the front end circuit 100, and in particular, the power amplifier 106 and the low noise amplifier 108, have a number of optimal performance characteristics. These include high linear power and high efficiency of the power amplifier 106 without transmitting excessive noise and spurious signals such as harmonics through the antenna 102. Additionally, the noise figure, or the amount of noise introduced into the RF signal by the low noise amplifier 108, is minimized, while having sufficient gain to offset any transmission losses and maximize sensitivity.

According to various embodiments of the present disclosure, the front end circuit 100 includes a matching and switch network 130 that is coupled to the power amplifier 106 and the low noise amplifier 108. The output from the power amplifier 106 and the input to the low noise amplifier 108 are tied together in the matching and switch network 130 and are common. Additionally, the matching and switch network 130 is coupled to the antenna 102. In addition to the power amplifier 106 and the low noise amplifier 108, various components of the matching and switch network 130 are controlled by the transmit enable line 114 and the receive enable line 116, respectively. Thus, the transmit enable port 124 and the receive enable port 126 are connected to the matching and switch network 130. The specificities regarding the configuration of the power amplifier 106, the low noise amplifier 108, and the matching and switch network 130 in relation to the aforementioned considerations will be described in greater detail below. It will be appreciated by those having ordinary skill in the art that such considerations are by way of example only and not of limitation. Furthermore, various performance trade-offs may be made in relation to the configuration of the front end circuit 100 while still being within the scope of the present disclosure.

Figure 2:
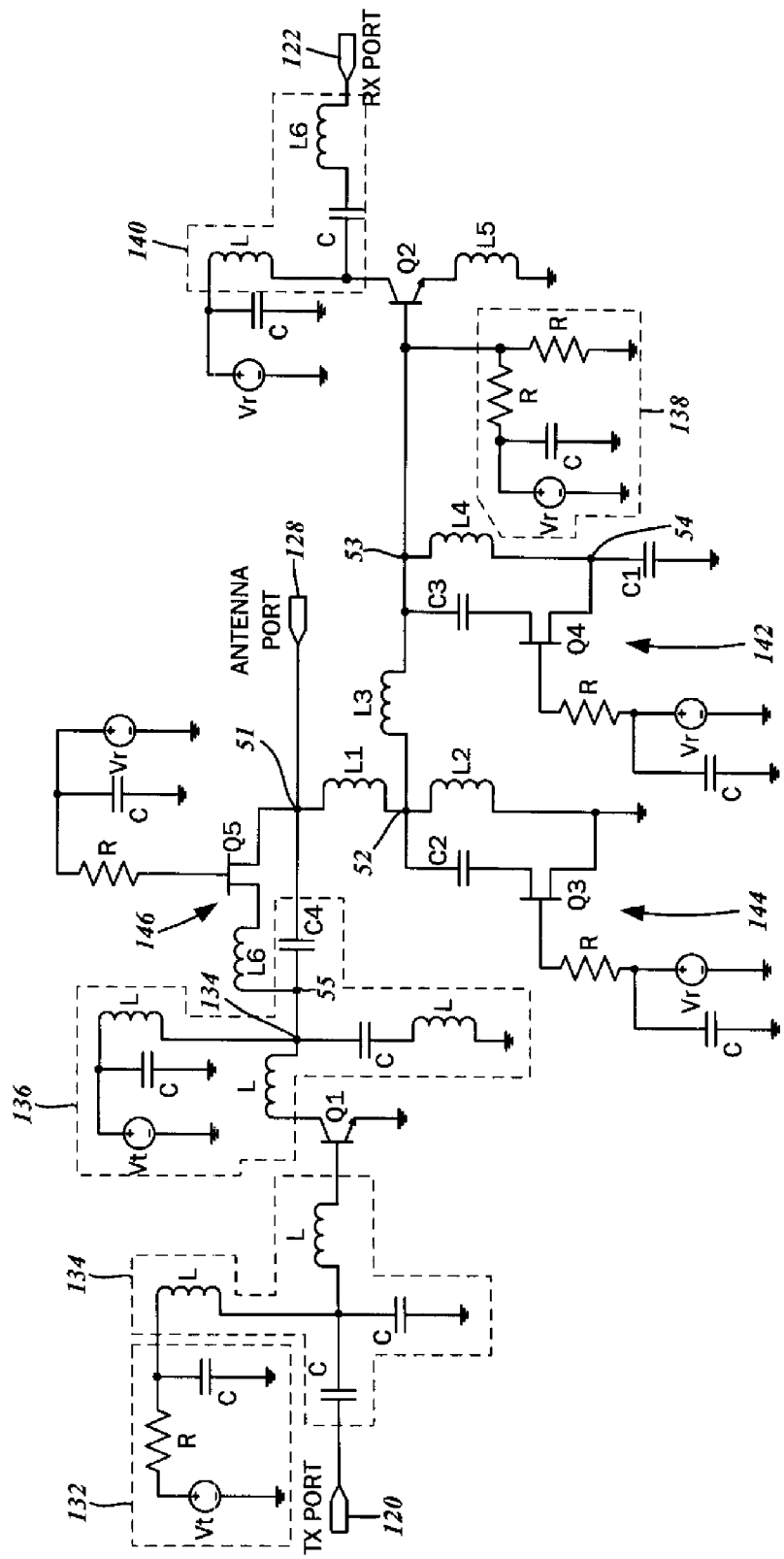
FIG. 2 is a schematic diagram of a first embodiment of the front end circuit.

The circuit diagram of FIG. 2 illustrates a first embodiment of the front end circuit 100a, including the transmit port 120, the receive port 122, and the antenna port 128. The transistor Q1 generally corresponds to the power amplifier 106, and is in a common-emitter configuration with a single amplification stage. The transistor Q2 generally corresponds to the low noise amplifier 108, and is also in a common-emitter configuration with a single amplification stage. It is understood that multi-stage amplifiers may be utilized for higher gain applications, and those having ordinary skill in the art will recognize the appropriate modifications to the basic configuration presented herein for such multi-stage amplifiers. In some embodiments, it is contemplated that the various transistors of the front end circuit 100, including transistors Q1 and Q2, have a bipolar junction structure. In other embodiments, the transistors may have a field-effect structure (MOSFET, MESFET, etc.) While the present disclosure variously references bases, collectors, and emitters of bipolar junction transistors, it is understood that such elements directly correspond to gates, drains, and sources, respectively, of field effect transistors.

The base of the transistor Q1, hence the power amplifier 106, is connected to the transmit port 120. Also connected to the base of the transistor Q1 is a transmit control circuit 132. An adjustable voltage source thereof is connected to the transmit enable port 124 and thus the transmit enable line 114. It is contemplated that the variable voltage generated on the transmit enable line 114 activates and deactivates the transistor Q1.

The bias conditions, in conjunction with the size or geometry of the transistor Q1, are chosen based on the linear operation requirements for transmission. Although a voltage supply circuit is shown, any other suitable supply such as a current mirror architecture may be substituted.

The power amplifier 106 also includes an input matching network 134 for matching the impedance of the base-emitter junction of the transistor Q1 an activated state with the impedance of the transmit port 120, and consequently the impedance of the transmit port 120 to the output impedance of the transceiver 104, which is typically 50 Ohm. The configuration of the input matching circuit network is selected according to gain, linearity, and wideband operation requirements.

The power amplifier 106 includes a corresponding output matching network 136, which impedance matches the transistor Q1 to the antenna 102 at the predefined operating frequency when active. The particular configuration of the power amplifier output matching network 136 is such that the resistive part of the impedance at the collector is equal or below the resistive component of an output impedance of transistor load impedance for the activated transistor Q1 that corresponds to a predetermined 1 dB compression point (P1 dB) at a specific bias voltage. The power amplifier output matching network 136 may be loaded at the antenna side by a predefined load (typically 50 Ohm).

The input of the low noise amplifier 108, that is, the base of the transistor Q2, is connected to an inductor L1 tied to the antenna port 128. In this regard, the junction between the antenna port 128, the inductor L1, and the output of the power amplifier 106 is referred to as a first node 51. The input impedance of the low noise amplifier 108 is matched to the antenna 102 in accordance with various embodiments of the present disclosure, the details of which will be discussed further below. Furthermore, as with the power amplifier 106, the low noise amplifier 108 includes a receive control circuit 138. An adjustable voltage source of the receive control circuit 138 is connected to the receive enable port 126 and thus the receive enable line 116. The variable voltage generated on the receive enable line 116 activates and deactivates the transistor Q2. The low noise amplifier 108 also includes an output matching network 140 that impedance matches the transistor Q2 to the receive line 112 of the transceiver 104. The size or active area of the transistor Q2 and its biasing conditions when turned on is preferably set to be between 10 Ohm and 50 Ohm, such that the losses associated with the input matching network of the low noise amplifier 108 have minimal influence on the total noise figure (NF) thereof.

As indicated above, the matching and switch network 130 of the front end circuit 100 is connected to the antenna port 128, the power amplifier 106, and the low noise amplifier 108. Various embodiments of the front end circuit 100 further contemplate the matching and switch network 130 including at least one resonant circuit that is activated by a control circuit that is coupled to the receive enable line 116 of the transceiver 104. Generally, the matching and switch network 130 in the receive mode matches the resistive part of an input impedance of the low noise amplifier 108 to an impedance of the antenna 102, while the resistive part of an output impedance of the power amplifier 106 in the transmit mode is set independently.

In the first embodiment of the front end circuit 100a shown in FIG. 2, there are three parallel resonant circuits that are activated by the transistors Q3, Q4, and Q5, which are referred to as RF switching transistors. The embodiments disclosed herein contemplate that the transistors are a field effect type, though it will be recognized that any other transistor structure may be utilized. A first resonant circuit 142 corresponds to the transistor Q4, a second resonant circuit 144 corresponds to the transistor Q3, and a third resonant circuit 146 corresponds to the transistor Q5. The second resonant circuit 144 is connected to the inductor L1 at a second node 52, while the first resonant circuit 142 is connected to the base of the transistor Q2 as well as the receive control circuit 138 at a third node 53. The third resonant circuit 146 is connected to the first node 51 and a fifth node 55, which is also connected to the collector of the transistor Q1 or the output of the power amplifier 106.

As noted above, in the transmit mode, the power amplifier 106, and specifically the transistor Q1, is activated. The low noise amplifier 108 and the transistor Q2 thereof, along with the RF switching transistors Q3, Q4, and Q5, are deactivated in the transmit mode. Thus, the low noise amplifier 108 and the RF switching transistors Q3, Q4, and Q5 are selectively activated in a substantially exclusive relation to the power amplifier 106. In the deactivated state, it is understood that the transistors have a substantially high impedance between the drain and source terminals, with the gate-source control voltage being below a predetermined threshold level. Furthermore, an inductor L4 and a capacitor C1 define a series resonance in the operating frequency band when the transistor Q4 is deactivated, and the inductance and capacitance values are selected to achieve the same.

Figure 3:
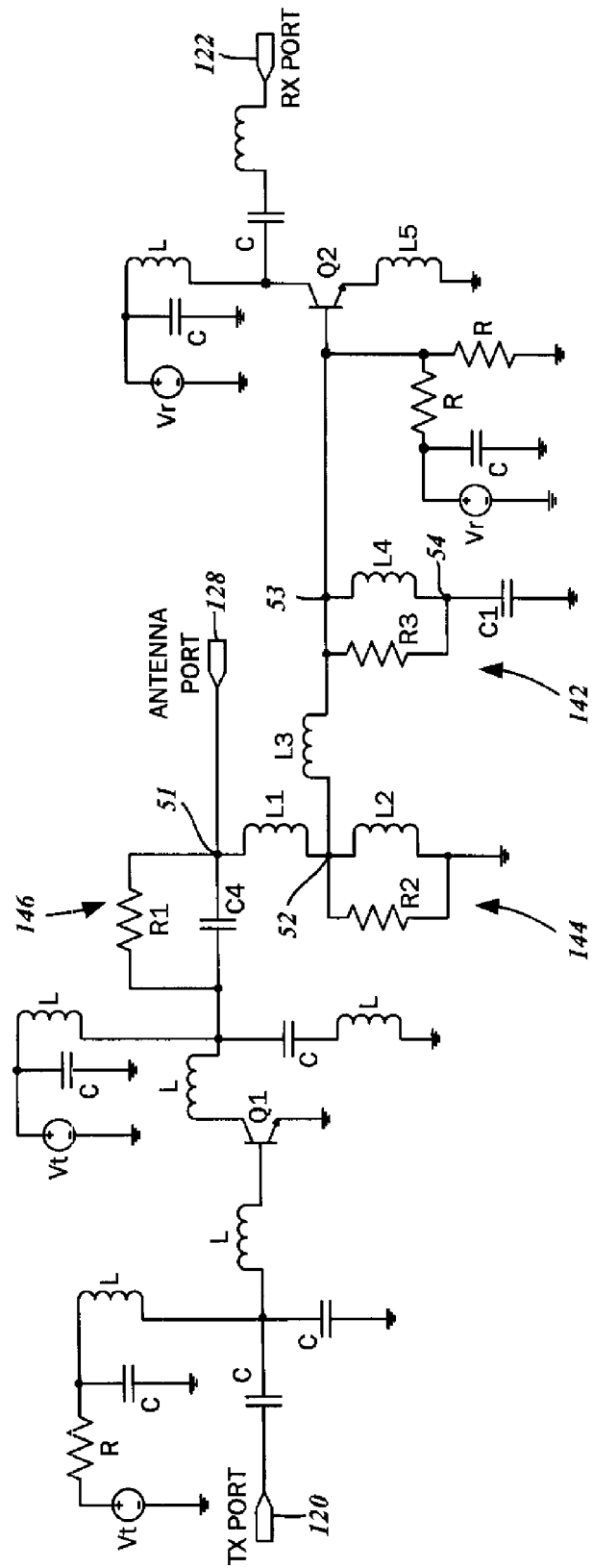
FIG. 3 is a schematic diagram of the first embodiment of the front end circuit with annotations showing a transmit mode.

The schematic diagram of FIG. 3 represents the first embodiment of the front end circuit 100a in the transmit mode. As indicated above, the RF switching transistors Q3, Q4, and Q5 are deactivated in the transmit mode. Accordingly, first resonant circuit 142 is represented as resistance R3, the second resonant circuit 144 is represented as resistance R2, and the third resonant circuit 146 is represented as resistance R1. The resistance values of R1, R2, and R3 are understood to be substantially high values, and are associated with the impedance of the deactivated switching transistors Q3, Q4, and Q5, respectively. The input impedance of the low noise amplifier 108 or the transistor Q2, is also understood to be substantially high when deactivated.

Figure 4:
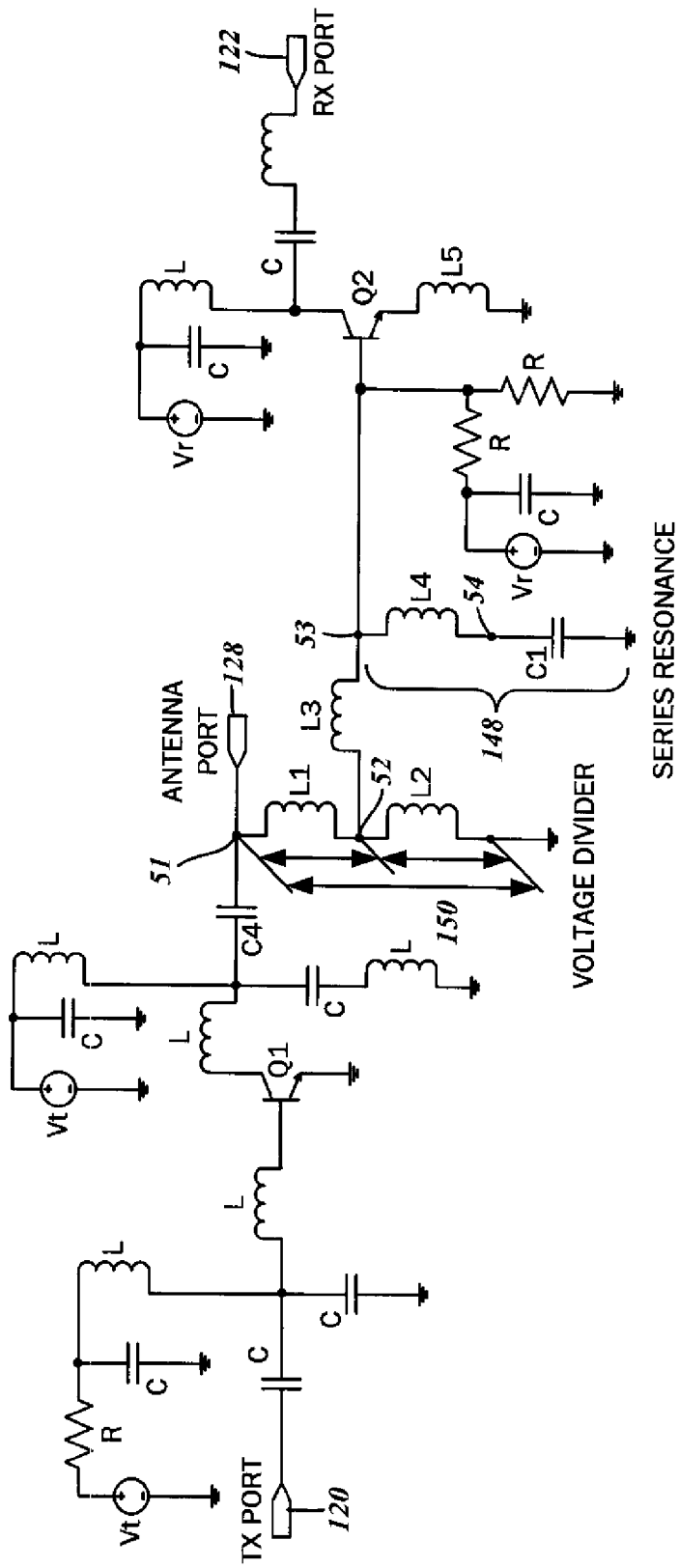
FIG. 4 is a schematic diagram of an equivalent circuit of the first embodiment of the front end circuit in the transmit mode.

FIG. 4 illustrates an equivalent circuit of the first embodiment of the front end circuit 100a in the transmit mode as shown in FIG. 3. As noted above, the inductor L4 and the capacitor C1 define a series resonance 148, which has a low impedance (i.e. of around 1 to 3 Ohms) in the operating frequency band. The values of the inductor L4 and the capacitor C1 are chosen with this as one objective. With the switching transistor Q3 deactivated and these components defining the series resonance, there is understood be a corresponding low voltage between the base of the transistor and ground. This, in turn, is understood to minimize the influence of the low noise amplifier 108, specifically the base-emitter impedance of the transistor Q2. Additionally, signal loss is minimized during the transmit mode.

One aspect of achieving transmit performance objectives involves impedance matching the antenna 102 to the power amplifier 106. In this regard, the inductance values of the inductors L1, L2, and L3 are selected such that L1+L2*L3/(L2+L3) is equivalent to the antenna inductance (Lant). Furthermore, as best illustrated in FIG. 4, the inductors L1 and L2 are understood to define a voltage divider 150 between the first node 51, the second node 52, and ground with the transistor Q3 being off. This feature is contemplated to decrease the voltage swing between the base of the transistor Q2 and ground while off, with the power amplifier 106 delivering a large signal to the antenna port 128. As indicated above, the low noise amplifier transistor Q2 is in common emitter configuration, with an inductor L5 tied to the emitter. The value of the inductor L5 is understood to be substantially low. The series resonance 148 provides a very low resistance (i.e. 1-Ohm to 3-Ohms) between node 53 and ground in the operating frequency band. The series resonance is defined by the capacitance value of the base-emitter junction of the transistor Q2 in off mode and the inductor L5, and are understood to be far above the operating frequency band.

With reference back to FIG. 2, additional details regarding the configuration of the first resonant circuit 142, the second resonant circuit 144, and the third resonant circuit 146 in the transmit mode will be considered. In the first resonant circuit 142, a high voltage may be induced between the third node 53 and the fourth node 54 at high transmit power levels with the transistor Q4 deactivated. The value of a capacitor C3 is chosen in such a way to be minimal while referenced to the drain-source capacitance of the transistor Q4 in the deactivated state, which is understood to create a voltage divider that reduces the voltage swing across the transistor Q4 thus increasing reliability performance thereof. The size of the transistor Q4 is selected based upon the breakdown voltage requirements thereof in relation to the voltage swing in the transmit mode. The value of the inductor L4 is chosen to obtain a parallel resonance in operating frequency band with capacitor C3 when the transistor Q4 is activated in the receive mode. Similarly, in the second resonant circuit 144, a high voltage may be likewise induced between the second node 52 and ground at high transmit power levels with the transistor Q3 deactivated. The value of the capacitor C2 is chosen in such a way to be minimal while referenced to the drain-source capacitance of the transistor Q3 in the deactivated state. Again, this is understood to create a voltage divider that reduces the voltage swing across the transistor Q3. In light of these factors, the size of the transistor Q3 is selected. It is contemplated that the third resonant circuit 146 has similar design considerations, as the high voltage may also be induced between the first node 51 and the fifth node 55 at high transmit power levels with the transistor Q5 deactivated. The value of the capacitor C4 is chosen in such a way to be minimal while referenced to the drain-source capacitance of the transistor Q5 when deactivated. Thus, a voltage divider that reduces the voltage swing across the transistor Q5 is contemplated. The size of the transistor Q5 can be determined based upon these factors.

Figure 5:
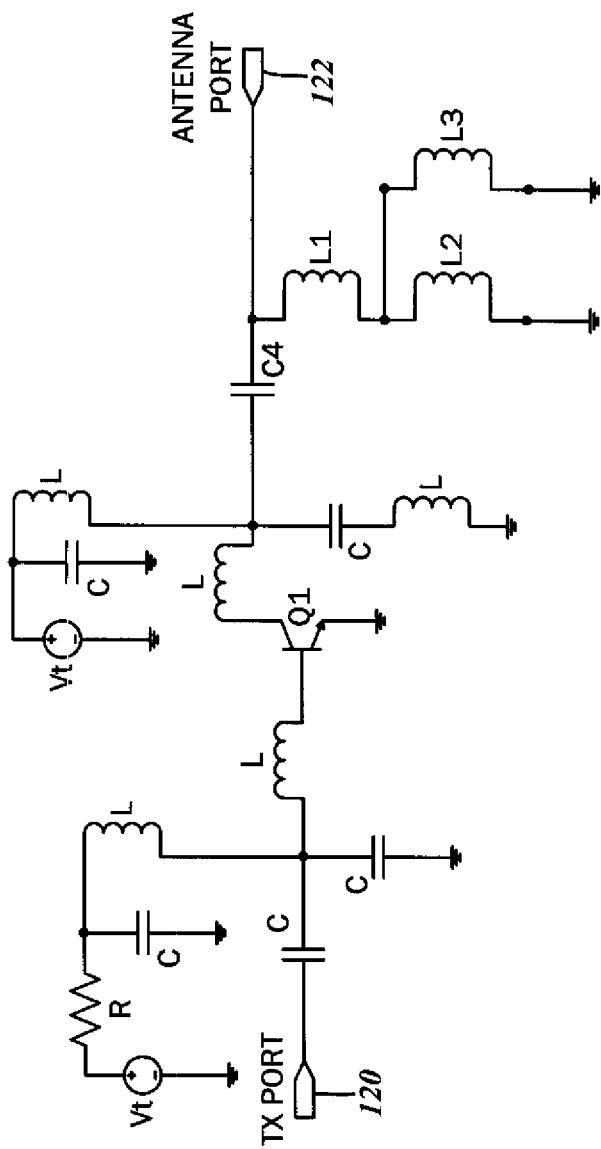
FIG. 5 is a schematic diagram of a simplified equivalent circuit of the first embodiment of the front end circuit in the transmit mode.

Referring now to FIG. 5, a further simplified equivalent circuit of the first embodiment of the front end circuit 100a is shown. The resistance of the series resonance 148 is understood to be minimal, and is connected to the inductor L3; thus contributing a negligible loss to the power amplifier output matching network 136 in the transmit mode. Further, the impedance associated with the base-emitter junction of the transistor Q2 when deactivated is understood to have a substantially high value. With the receive control circuit 138 connected in parallel to the inductor L3 likewise contributes a negligible loss to the power amplifier output matching network 136 in the transmit mode.

Figure 6:
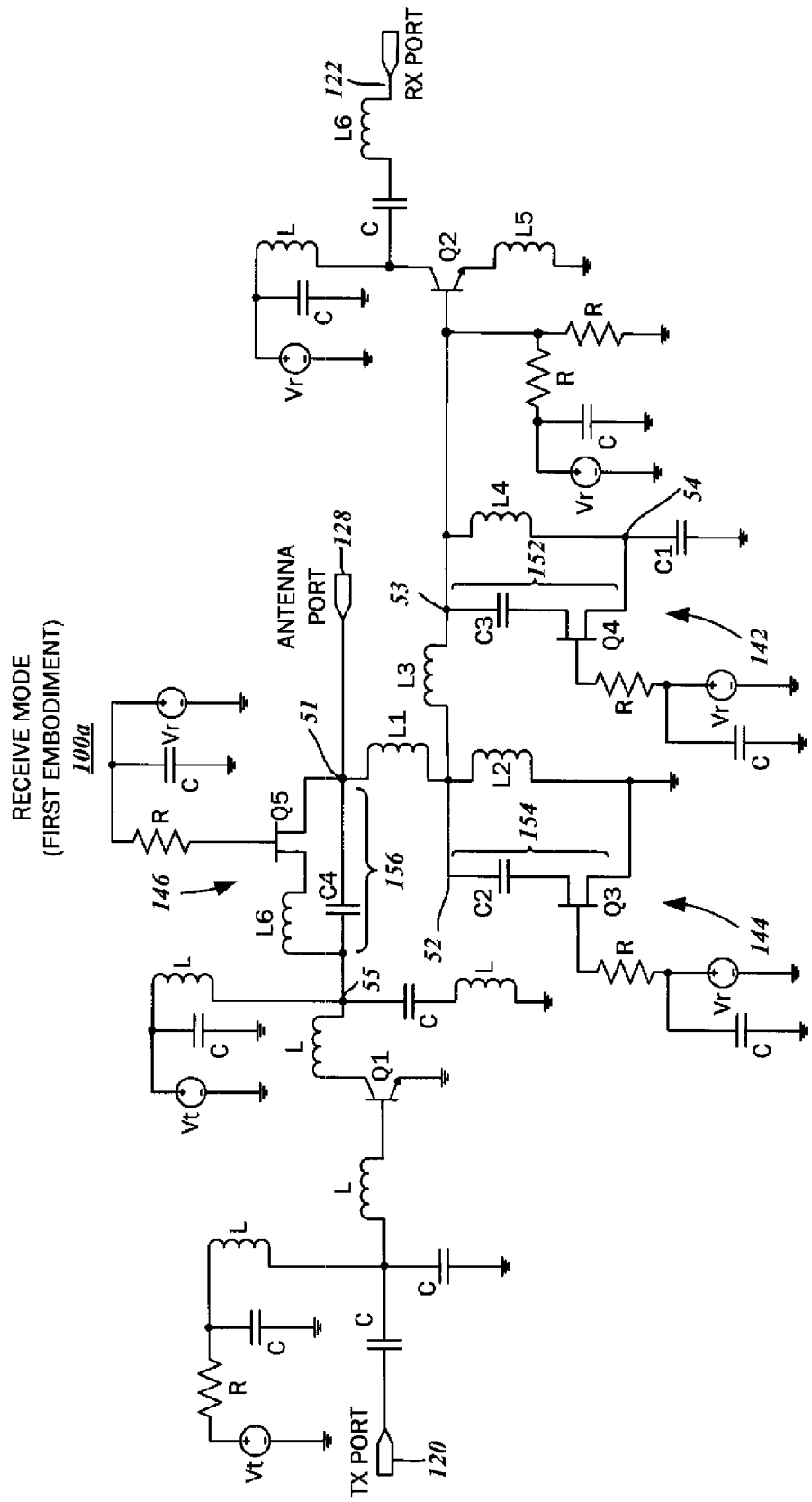
FIG. 6 is a schematic diagram of the first embodiment of the front end circuit with annotations depicting a receive mode.

In the receive mode, again as described above, the low noise amplifier 108 and the transistor Q2 thereof, is activated, while the power amplifier 106 and the transistor Q1 thereof are deactivated. Along with the transistor Q2, the RF switching transistors Q3, Q4, and Q5 are activated. Generally, with the RF switching transistors Q3, Q4, and Q5 turned on, the respective resonance circuits are activated to define a parallel resonance and a corresponding resonance resistance in the operating frequency band. FIG. 6 is a schematic diagram of the first embodiment of the front end circuit 100a and is a reproduction of the schematic diagram shown in FIG. 2, though certain features particular to the receive mode are highlighted.

The first resonant circuit 142 defines a first parallel resonance 152 in the operating frequency band with the transistor Q4 activated. The values of the inductor L4 and the capacitor C3, as well as the biasing conditions of the transistor Q4, are selected with this objective. The first parallel resonance 152 is understood to have a corresponding resonance resistance that is substantially high, particularly in comparison to the series resonance 148. Preferably, though optionally, the resonance resistance may be greater than 100 Ohm.

The second resonant circuit 144 defines a second parallel resonance 154 in the operating frequency band with the transistor Q3 activated. The values of the inductor L2 and the capacitor C2, as well as the biasing conditions of the transistor Q3, are selected with this objective. The second parallel resonance 154 is understood to have a corresponding resonance resistance that is substantially high which may be greater than 100 Ohm.

The third resonant circuit 146 defines a third parallel resonance 156 in the operating frequency band with the transistor Q5 activated. The values of the inductor L6 and the capacitor C4, as well as the biasing conditions of the transistor Q5, are selected with this objective. The third parallel resonance 156 is understood to have a corresponding resonance resistance that is substantially high. Preferably, though optionally, the resonance resistance may be greater than 100 Ohm.

Figure 7:
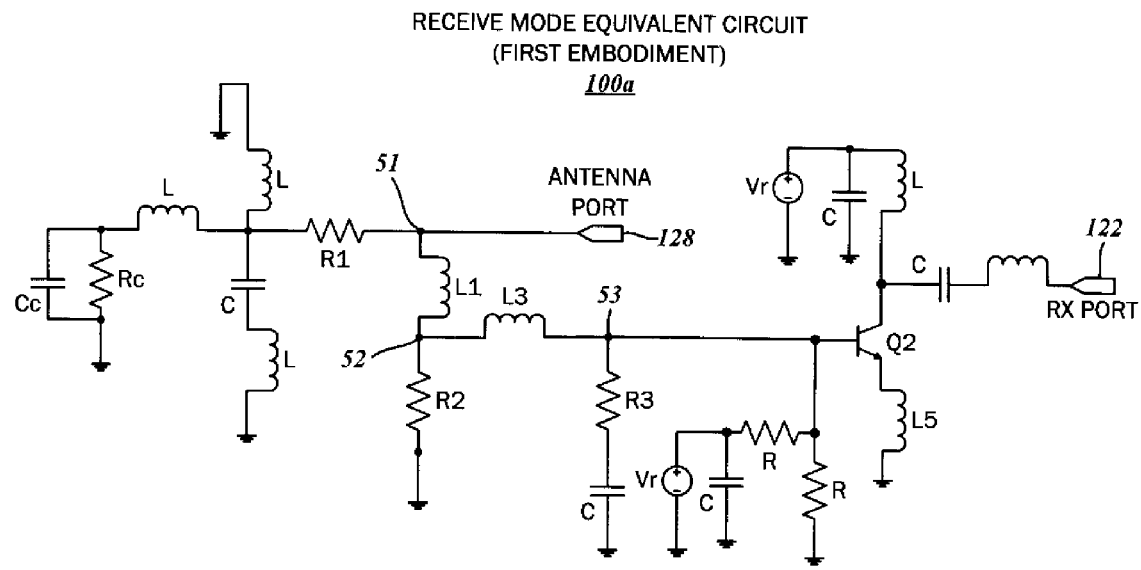
FIG. 7 is a schematic diagram of an equivalent circuit of the first embodiment of the front end circuit in the receive mode.

FIG. 7 shows an equivalent circuit of the first embodiment of the front end circuit 100a. In further detail, the resistor Rc represents the resistive (real) component of the collector-emitter impedance of the power amplifier transistor Q1 in the deactivated state, while the capacitor Cc represents the capacitive (imaginary) part of the same. Furthermore, the resistor R3 represents the resonance resistance of the first parallel resonance 152, while the resistor R2 represents the resonance resistance of the second parallel resonance 154, and the resistor R1 represents the resonance resistance of the third parallel resonance 156, with the respective RF switch transistors Q4, Q3, and Q5 being activated. The aforementioned resistances R1, R2, and R3 are understood to have substantially high values such that corresponding nodes thereof are decoupled from the other parts of the front end circuit 100.

Figure 8:
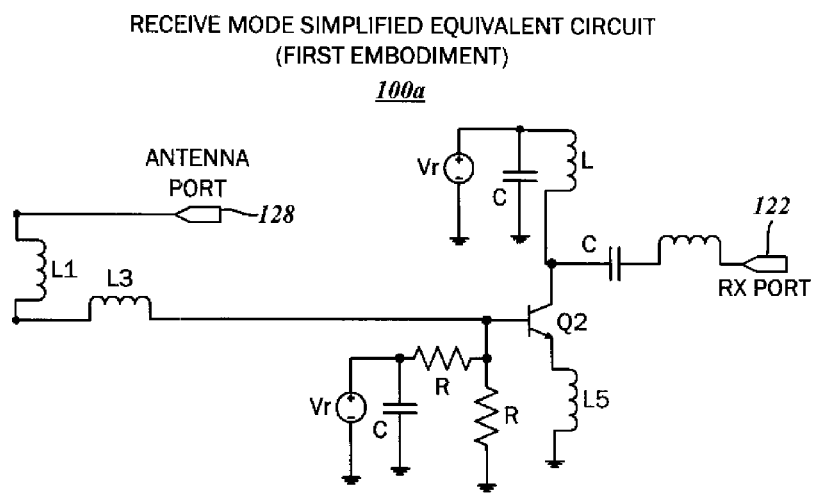
FIG. 8 is a schematic diagram of a simplified equivalent circuit of the first embodiment of the front end circuit in the receive mode.

With reference to FIG. 8, a further simplified equivalent circuit of the first embodiment of the front end circuit 100a is depicted. The combined inductor L1 and L3 is representative of the inductance connected to the antenna 102, and is understood to match the base-emitter impedance of the low noise amplifier transistor Q2 in the activated state to the antenna impedance, which is typically 50 Ohms. The values of the inductors L1 and L3 are selected to obtain an acceptable overall noise figure (NF) of the low noise amplifier 108, which according to one embodiment, is less than 3 dB. Additionally, the values of the inductors L1 and L3 are selected to appropriately match the antenna port 128 to the transistor Q2 in the receive mode when the transistor Q2 is on. In accordance with one embodiment of the present disclosure, a contemplated impedance matching (S11) is less than −10 dB. It is understood that the inductor L5 further aids in matching the impedance of the antenna 102 to the low noise amplifier 108.

Figure 9:
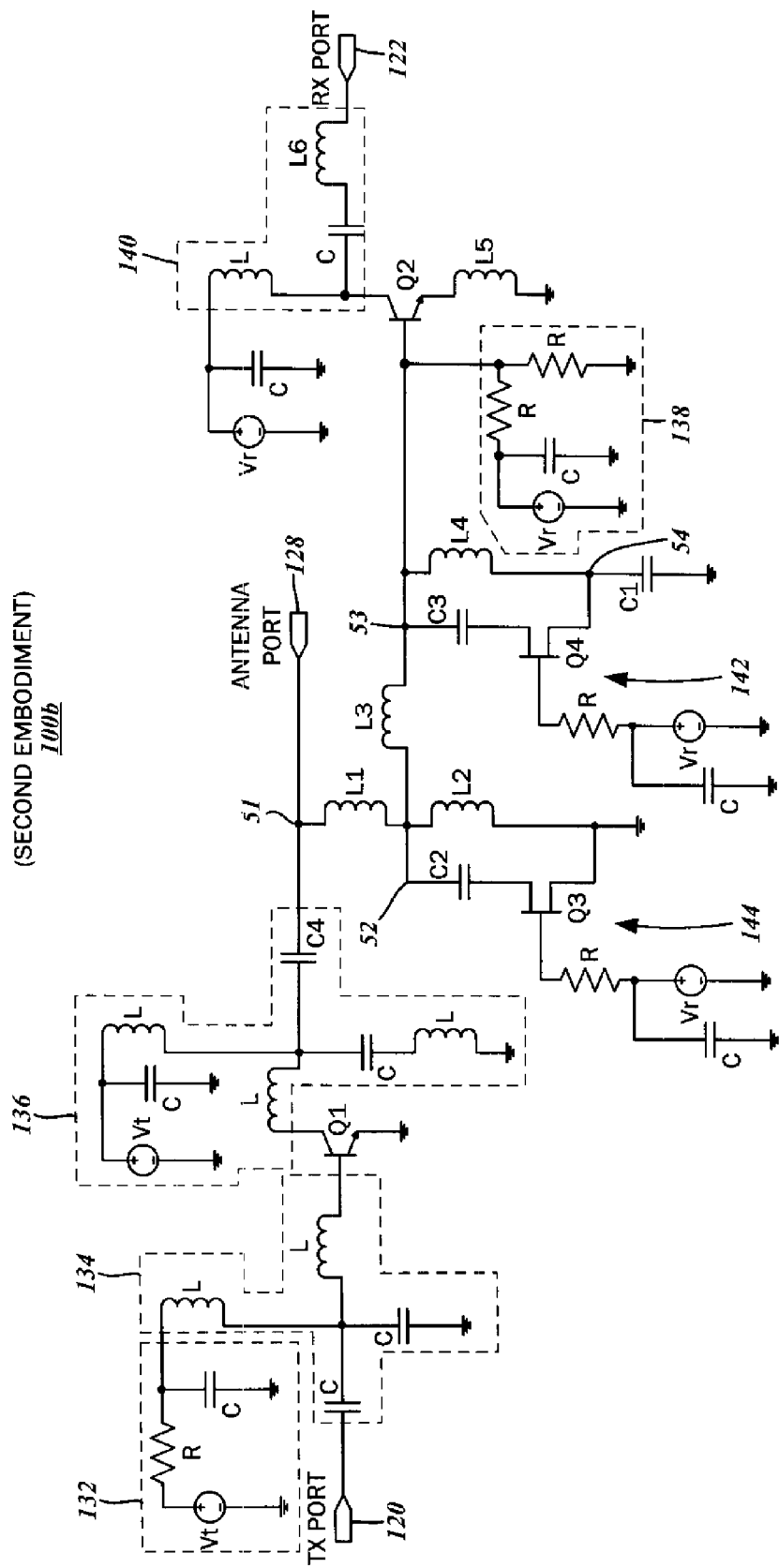
FIG. 9 is a schematic diagram of a second embodiment of the front end circuit.

FIG. 9 shows a second embodiment of the front end circuit 100b, in which the selection of the resistive part of the impedance of the low noise amplifier 108 in the activated state is set independently of the required resistive part of the output transistor Q1 impedance of the power amplifier 106. Thus, it is not necessary for 50 Ohm impedance matching. Like the first embodiment of the front end circuit 100a described above, the transistor Q1 generally corresponds to the power amplifier 106, and is in a common-emitter configuration with a single amplification stage. Similarly, the transistor Q2 generally corresponds to the low noise amplifier 108, and is also in a common-emitter configuration with a single amplification stage.

The base of the transistor Q1 is connected to the transmit port 120. The transmit control circuit 132, which is connected to the base of the transistor Q1, is identical to the first embodiment of the front end circuit 100a. The adjustable voltage source thereof is connected to the transmit enable port 124, and it is contemplated that the variable voltage generated on the transmit enable line 114 activates and deactivates the transistor Q1. The power amplifier 106 also includes the same input matching network 134 for matching the impedance of the transmit port 120 to the output impedance of the transceiver 104. Along these lines, the power amplifier output matching network 136 is also included in the second embodiment of the front end circuit 100b, and impedance matches the transistor Q1 to the antenna 102 at the predefined operating frequency when active.

The input of the low noise amplifier 108, and specifically the base of the transistor Q2, is connected to the inductor L1 tied to the antenna port 128. The junction between the antenna port 128, the inductor L1, and the output of the power amplifier 106 is referred to as the first node 51. The input impedance of the low noise amplifier 108 is matched to the antenna 102. The receive control circuit 138 discussed above in relation to the first embodiment of the front end circuit 100a is also a part of the low noise amplifier 108. The adjustable voltage source of the receive control circuit 138 is connected to the receive enable port 126, and the variable voltage generated on the receive enable line 116 activates and deactivates the transistor Q2. The low noise amplifier 108 also includes the same low noise amplifier output matching network 140 that impedance matches the transistor Q2 to the receive line 112 of the transceiver 104.

The second embodiment of the front end circuit 100b contemplates the matching and switch network 130 including the first resonant circuit 142 with the corresponding RF switching transistor Q4, and the second resonant circuit 144 with the corresponding RF switching transistor Q3. Again, although a field effect transistor is utilized, any other type of transistor may be substituted. The second resonant circuit 144 is connected to the inductor L1 at the second node 52.

The transistor Q1, which corresponds to the power amplifier 106, is activated in the transmit mode. However, the transistor Q2, which corresponds to the low noise amplifier 108, is deactivated. Additionally, the RF switching transistors Q3 and Q4 are deactivated. Thus, the low noise amplifier 108 and the RF switching transistors Q3 and Q4 are selectively activated in a substantially exclusive relation to the power amplifier 106. In the deactivated state, it is understood that the transistors Q3 and Q4 have a substantially high impedance between the drain and source terminals, with the gate-source control voltage being below a predetermined threshold level. Furthermore, an inductor L4 and a capacitor C1 define a series resonance in the operating frequency band when the transistor Q4 is deactivated, and the inductance and capacitance values are selected to achieve the same.

Figure 10:
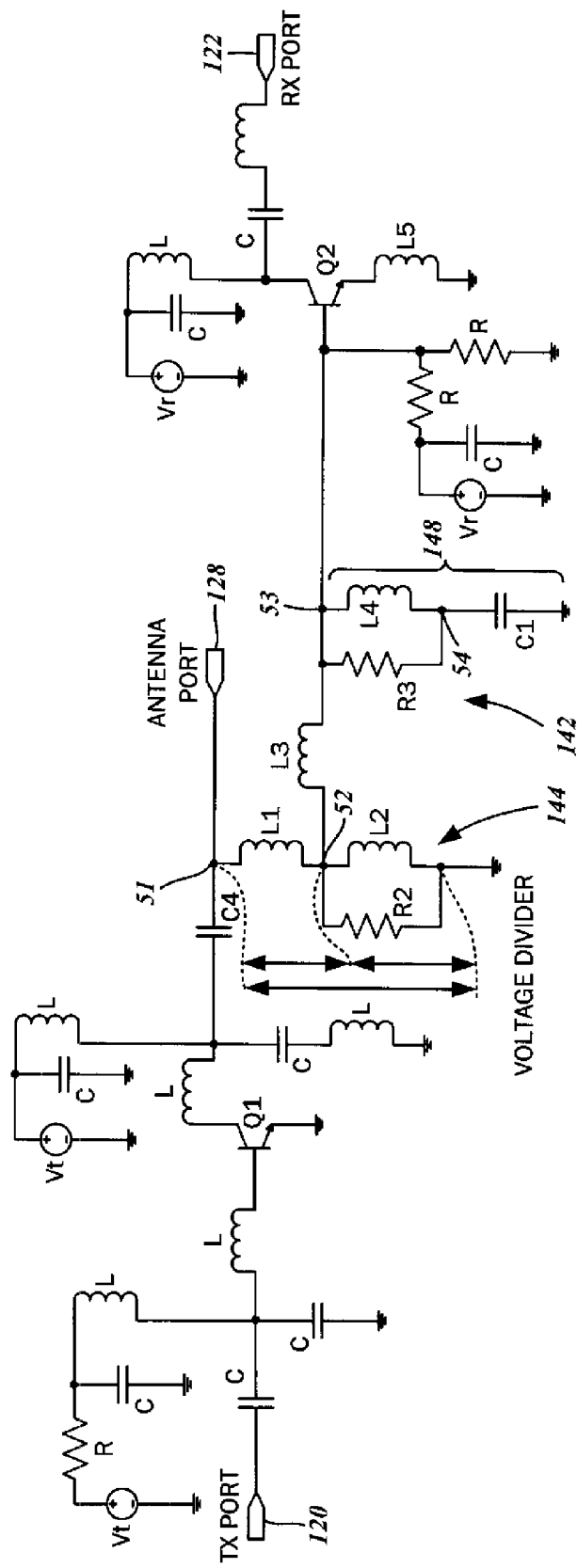
FIG. 10 is a schematic diagram of the second embodiment of the front end circuit with annotations showing a transmit mode.

The schematic diagram of FIG. 10 represents the second embodiment of the front end circuit 100b in the transmit mode, in which state the RF switching transistors Q3 and Q4 are deactivated. The first resonant circuit 142 is represented as resistance R3, and the second resonant circuit 144 is represented as resistance R2. The resistance values of R3 and R2 are understood to be substantially high values, and are associated with the impedance of the deactivated switching transistors Q3 and Q4, respectively. The input impedance of the low noise amplifier 108 or base-emitter junction of the transistor Q2, is also understood to be substantially high when deactivated.

Figure 11:
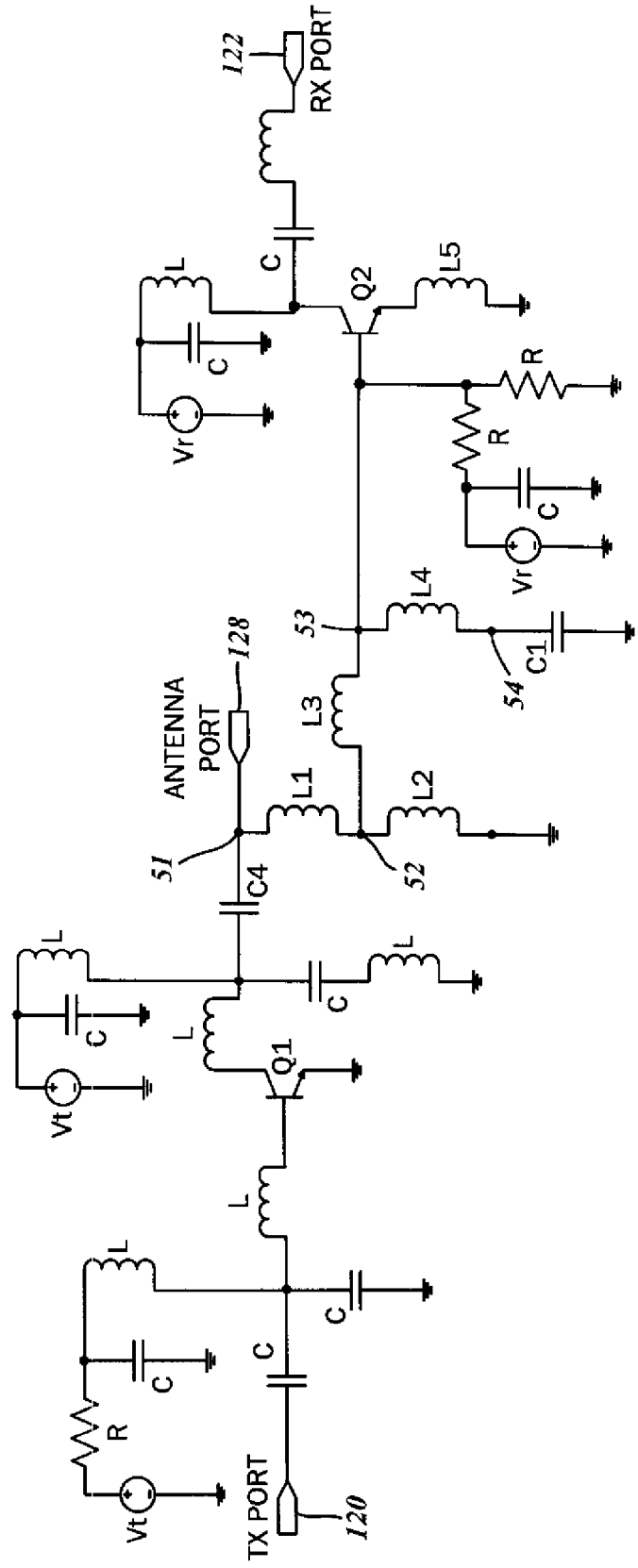
FIG. 11 is a schematic diagram of an equivalent circuit of the second embodiment of the front end circuit in the transmit mode.

FIG. 11 illustrates an equivalent circuit of the second embodiment of the front end circuit 100b in the transmit mode as shown in FIG. 10. The inductor L4 and the capacitor C1 define a series resonance 148, which has a low impedance (i.e. of around 1 to 3 Ohms) in the operating frequency band. The values of the inductor L4 and the capacitor C4 are chosen with this as an objective. With the switching transistor Q4 deactivated and these components defining the series resonance, there is understood be a corresponding low voltage between the base of the deactivated transistor Q3 and ground. This, in turn, is understood to minimize the influence of the low noise amplifier 108, specifically the base-emitter impedance of the transistor Q2. Again, signal loss is minimized during the transmit mode.

One aspect of achieving transmit performance objectives involves impedance matching the antenna 102 to the power amplifier 106. In the transmit mode, the inductance values of the inductors L1, L2, and L3 are selected such that L1+L2*L3/(L2+L3) is equivalent to the antenna inductance (Lant). Furthermore, as best illustrated in FIG. 10, the inductors L1 and L2 are understood to define a voltage divider 150 between the first node 51, the second node 52, and ground with the transistor Q3 being off. This feature is contemplated to decrease the voltage swing between the base of the transistor Q2 and ground while off, with the power amplifier 106 delivering a large signal to the antenna port 128. As indicated above, the low noise amplifier transistor Q2 is in common emitter configuration, with an inductor L5 tied to the emitter. The value of the inductor L5 is understood to be substantially low. The series resonance 148 provides a very low resistance (i.e. 1 Ohm to 3 Ohms) between node 53 and ground in operating frequency band. The series resonance defined by the capacitance value of the base-emitter junction of the transistor Q2 in deactivated state and the inductor L5 is understood to be far above the operating frequency band.

Referring back to FIG. 9, in the first resonant circuit 142, a high voltage may be induced between the third node 53 and the fourth node 54 at high transmit power levels with the transistor Q4 deactivated. The value of a capacitor C3 is chosen in such a way to be minimal while referenced to the drain-source capacitance of the transistor Q4 in the deactivated state, which is understood to create a voltage divider that reduces the voltage swing across the transistor Q4. The size of the transistor Q4 is selected based upon the breakdown voltage requirements thereof in relation to the voltage swing in the transmit mode. Similarly, in the second resonant circuit 144, a high voltage may be likewise induced between the second node 52 and ground at high transmit power levels with the transistor Q3 deactivated. The value of the capacitor C2 is chosen in such a way to be minimal while referenced to the drain-source capacitance of the transistor Q3 in the deactivated state. Again, this is understood to create a voltage divider that reduces the voltage swing across the transistor Q3. In light of these factors, the size of the transistor Q3 is selected.

Figure 12:
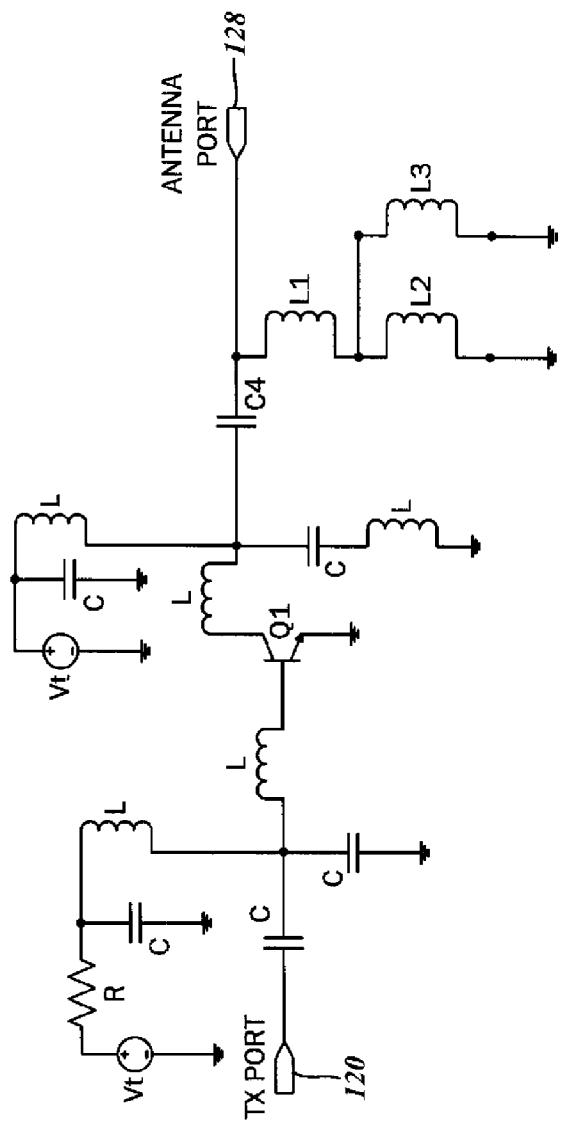
FIG. 12 is a schematic diagram of a simplified equivalent circuit of the second embodiment of the front end circuit in the transmit mode.

A simplified equivalent circuit of the second embodiment of the front end circuit 100b is shown in FIG. 12. The resistance of the series resonance 148 is understood to be minimal and is connected to the inductor L3; thus contributing a negligible loss to the power amplifier output matching network 136 in the transmit mode. Accordingly, it is not depicted. Further, the impedance associated with the base-emitter junction of the transistor Q2 when deactivated is understood to have a substantially high value. With the receive control circuit 138 connected in parallel to the inductor L3 likewise contributes a negligible loss to the power amplifier output matching network 136 in the transmit mode.

In the receive mode, the low noise amplifier 108 and the transistor Q2 thereof, is activated, while the power amplifier 106 and the transistor Q1 thereof are deactivated. Along with the transistor Q2, the RF switching transistors Q3 and Q4 are activated. Generally, with the RF switching transistors Q3 and Q4 turned on, the respective resonance circuits are activated to define a parallel resonance and a corresponding resonance resistance in the operating frequency band.

Figure 13:
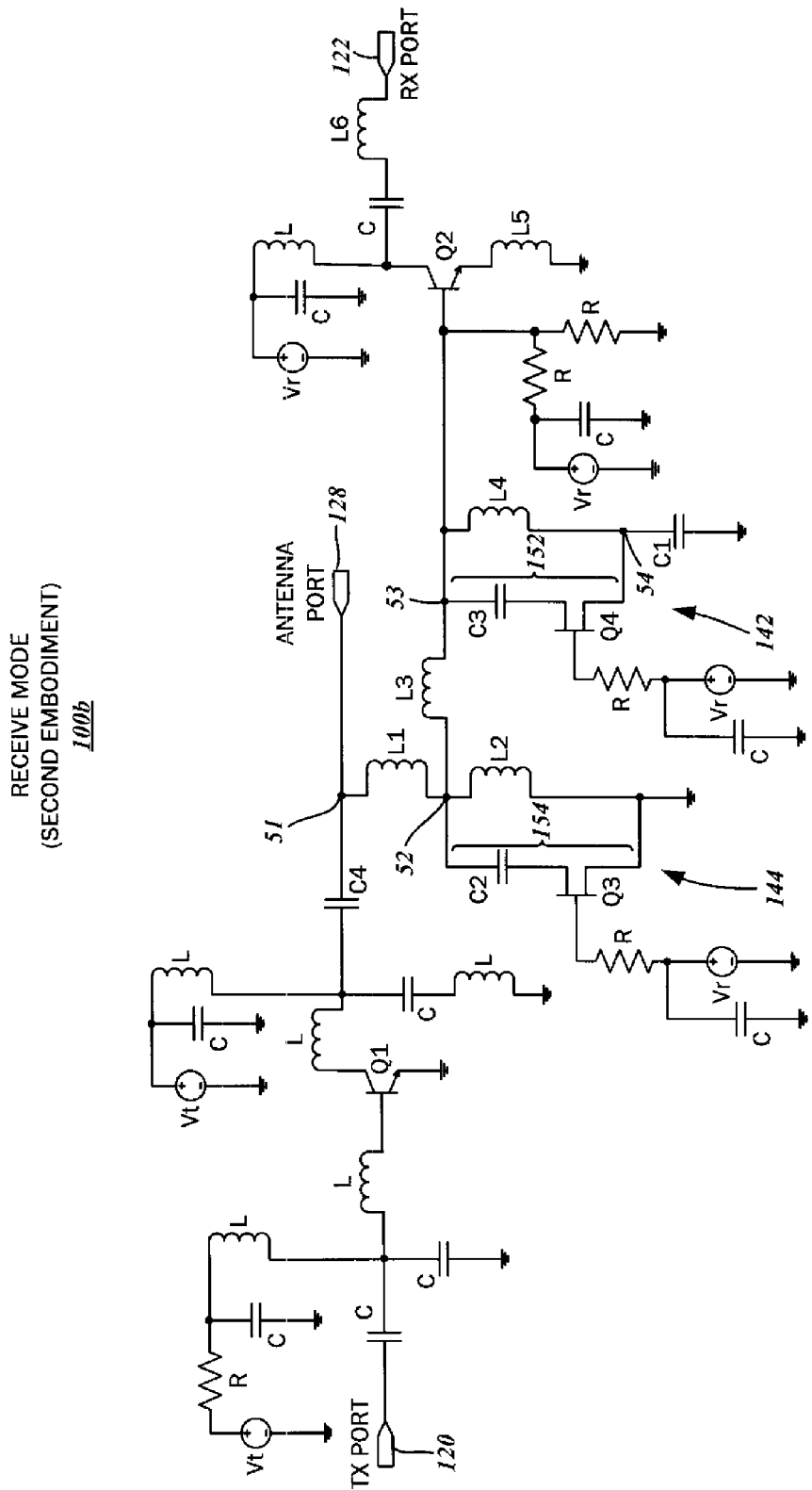
FIG. 13 is a schematic diagram of the second embodiment of the front end circuit with annotations showing a receive mode.

FIG. 13 is a schematic diagram of the second embodiment of the front end circuit 100b and is a reproduction of the schematic diagram shown in FIG. 9, though certain features particular to the receive mode are highlighted. The first resonant circuit 142 defines the first parallel resonance 152 in the operating frequency band with the transistor Q4 activated. The values of the inductor L4 and the capacitor C3, as well as the biasing conditions of the transistor Q4, are selected with this objective. The first parallel resonance 152 is understood to have a corresponding resonance resistance that is substantially high, particularly in comparison to the series resonance resistance 148 noted above. Preferably, though optionally, the resonance resistance may be greater than 100 Ohm. The second resonant circuit 144 defines a second parallel resonance 154 in the operating frequency band with the transistor Q3 activated. The values of the inductor L2 and the capacitor C2, as well as the biasing conditions of the transistor Q3, are selected with this objective. The second parallel resonance 154 is understood to have a corresponding resonance resistance that is substantially high which may be greater than 100 Ohm.

The equivalent inductance of the combined inductors L1 and L3 is contemplated to be part of a matching circuit that impedance matches the 50 Ohm antenna port 128 with the base-emitter impedance of the transistor Q2 in an activated state. The values of the inductors L1 and L3 are selected to obtain an acceptable overall noise figure (NF) of the low noise amplifier 108, which according to one embodiment, is less than 3 dB. Additionally, the values of the inductors L1 and L3 are selected to appropriately match the antenna port 128 to the transistor Q2 in the receive mode when the transistor Q2 is on. In accordance with one embodiment of the present disclosure, a contemplated impedance matching (S11) is less than −10 dB. The inductor L5 tied to the emitter of the transistor Q2 is also understood to aid in matching to the antenna impedance as well. The geometry or size of the transistor Q2, along with its biasing conditions, can be optimized to achieve a base-emitter impedance of less than 50 Ohms but more than 10 Ohms during activation. In this regard, the influence of the total noise figure of the low noise amplifier 108 can be minimized.

Figure 14:
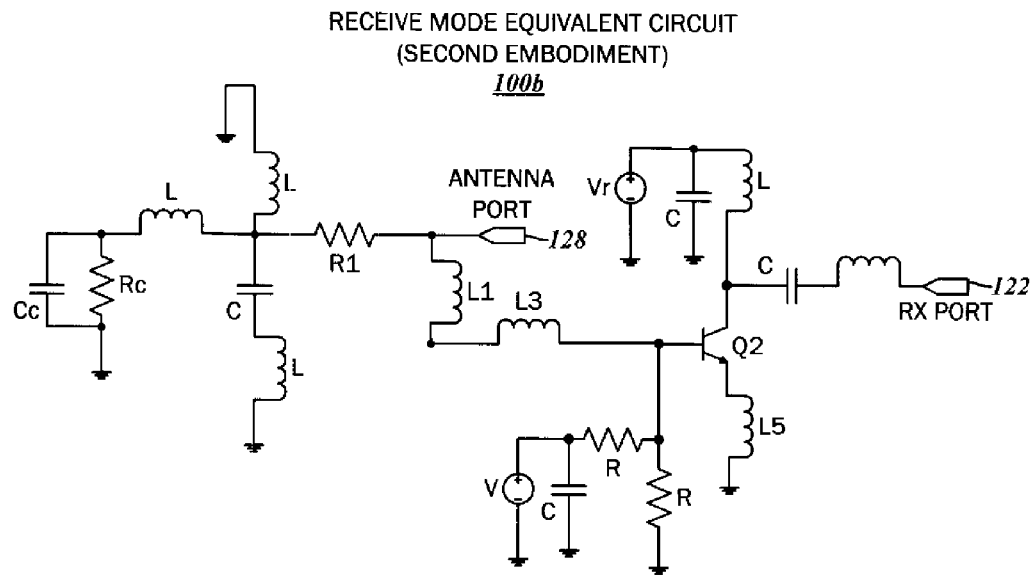
FIG. 14 is a schematic diagram of an equivalent circuit of the second embodiment of the front end circuit in the receive mode.

FIG. 14 shows an equivalent circuit of the second embodiment of the front end circuit 100b. In further detail, the resistor Rc represents the resistive (real) component of the collector-emitter impedance of the power amplifier transistor Q1 in the deactivated state, while the capacitor Cc represents the capacitive (imaginary) part of the same. Resistance Rc is understood have a substantially high value, thus decoupling the power amplifier 106 from the other parts of the front end circuit 100. The collector-emitter impedance of the power amplifier transistor Q1 is also understood to provide an additional component for impedance matching the input of the low noise amplifier transistor Q2 while it is activated.

Figure 15:
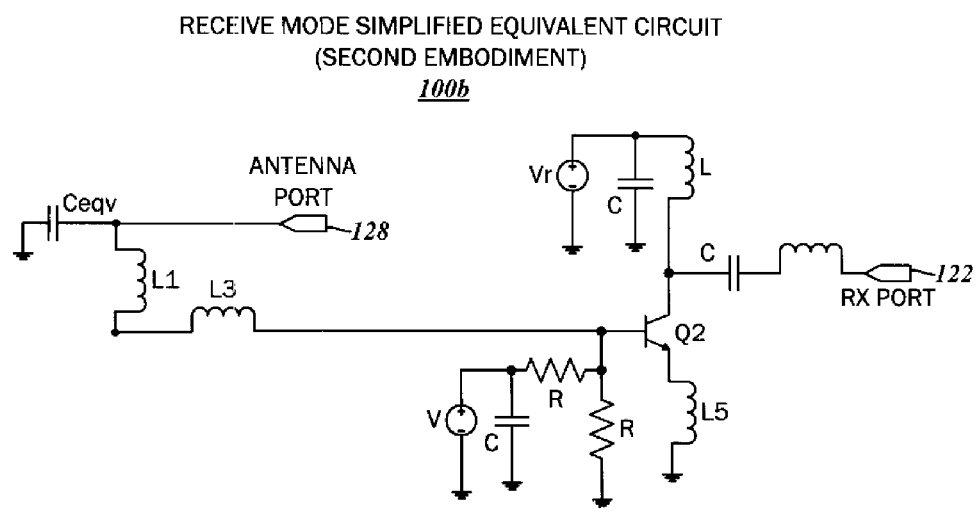
FIG. 15 is a schematic diagram of a simplified equivalent circuit of the second embodiment of the front end circuit in the receive mode.

A simplified version of the equivalent circuit of the second embodiment of the front end circuit 100b is shown in FIG. 15. With reference thereto, equivalent capacitance Ceqv is understood to represent the typical capacitive impedance in the operating frequency band for the output matching circuit of the power amplifier 106. It is also understood that the collector-emitter impedance of the power amplifier transistor Q1 in a deactivated state is included. Thus, the equivalent capacitance Ceqv, together with the equivalent inductance of the combined L1 and L3 inductors, represents the matching circuit between the antenna 102 and the base-emitter impedance of the low noise amplifier transistor Q2 in an activated state. This equivalent inductance is understood to affect the noise figure of the receive chain the most if the parallel resonant circuits have a substantially high resonant resistance.

Figure 16:
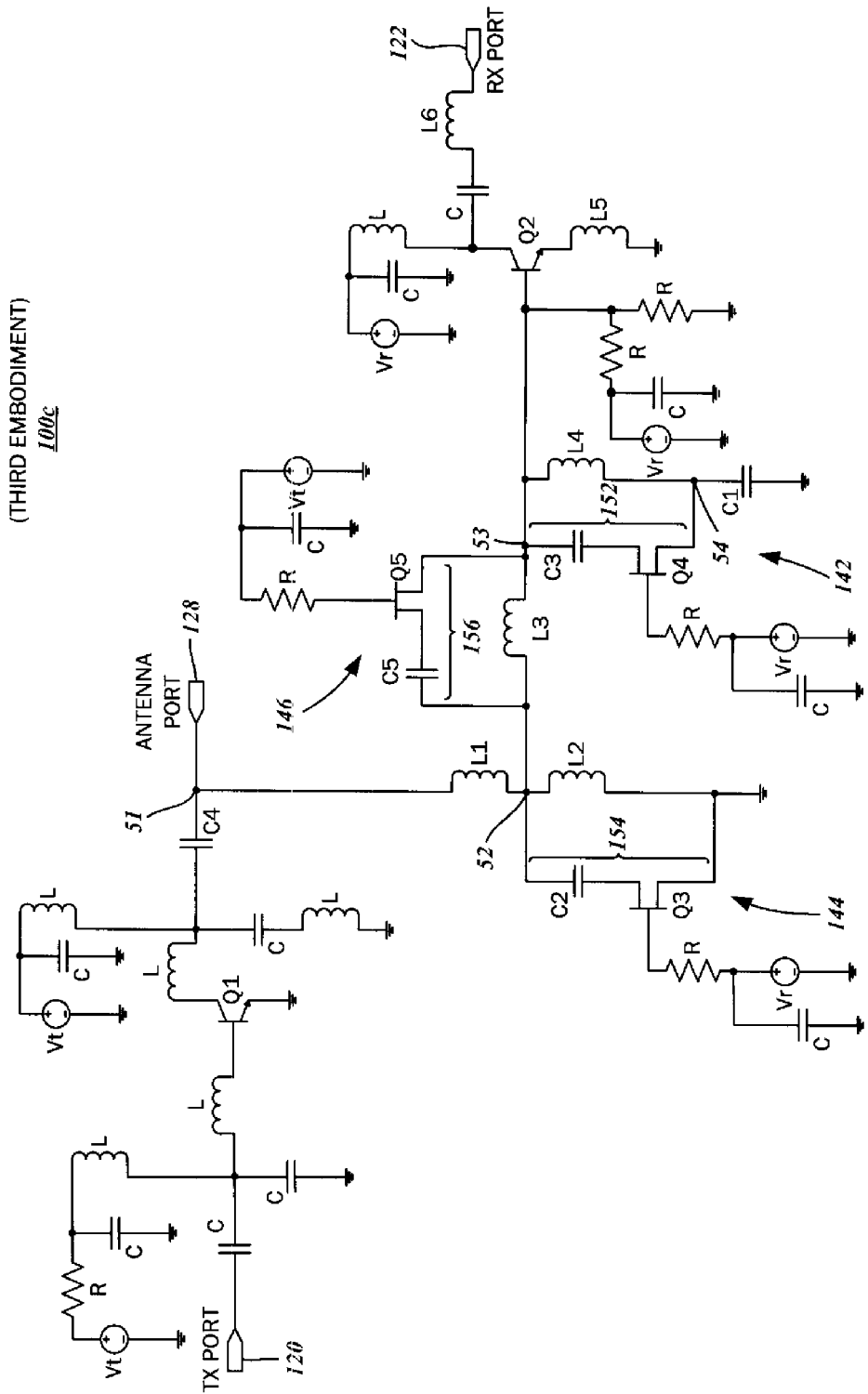
FIG. 16 is a schematic diagram of a third embodiment of the front end circuit including an additional parallel resonant circuit.

A third embodiment of the front end circuit 100c is shown in FIG. 16. It is contemplated that this embodiment is similar to the second embodiment of the front end circuit 100b, except with an additional parallel resonant circuit. It is contemplated that activating this additional parallel resonant circuit in the transmit mode further minimizes the voltage swing at the input of the low noise amplifier transistor Q2, the details of which will be described more fully below. Again, like the first embodiment of the front end circuit 100a and the second embodiment of the front end circuit 100b described above, the transistor Q1 generally corresponds to the power amplifier 106, and is in a common-emitter configuration with a single amplification stage. Similarly, the transistor Q2 generally corresponds to the low noise amplifier 108, and is also in a common-emitter configuration with a single amplification stage. The various control circuits, the input and output matching circuits for the power amplifier 106, and the output matching circuit for the low noise amplifier 108 are as discussed above in relation to the other embodiments, and the details pertaining to the features of which will not be repeated.

The third embodiment of the front end circuit 100c contemplates the matching and switch network 130 including the first resonant circuit 142 with the corresponding RF switching transistor Q4, the second resonant circuit 144 with the corresponding RF switching transistor Q3, and the third resonant circuit 146 with the corresponding RF switching transistor Q5. Again, although a field effect transistor is utilized, any other type of transistor may be substituted. The second resonant circuit 144 is connected to the inductor L1 at the second node 52, while the third resonant circuit 146 is connected to the second node 52 and the third node 53 that is connected to the first resonant circuit 142 and the base of the low noise amplifier transistor Q2.

The transistor Q1, which corresponds to the power amplifier 106, and the RF switching transistor Q5 are activated in the transmit mode. Concurrently, the transistor Q2, which corresponds to the low noise amplifier 108, is deactivated. The RF switching transistors Q3 and Q4 are also deactivated. In the respective deactivated states, it is understood that the transistors Q3, Q4 and Q5 have a substantially high impedance between the drain and source terminals, with the gate-source control voltage being below a predetermined threshold level. Furthermore, an inductor L4 and a capacitor C1 define a series resonance in the operating frequency band when the transistor Q4 is deactivated, and the inductance and capacitance values are selected to achieve the same.

As indicated above, the third parallel resonance 156 is activated in the transmit mode. Thus, the inductor L3, the capacitor C5, and the biasing and size/geometry of the transistor Q5 are configured to obtain the third parallel resonance 156 in the operating frequency band with a substantially high resonant resistance. According to one embodiment, the third parallel resonance 156 is greater than 50 Ohms. This is understood to create a voltage divider between the second node 52, the third node 53, and ground, as the series resonant circuit comprised of capacitor C1 and inductor L4 has a low impedance when the transistor Q4 is deactivated. It is contemplated that the influence of the base-emitter impedance of the low noise amplifier transistor Q2 in a deactivated state is minimized to a negligible level, along with a concomitant minimization of the transmit signal.

In the transmit mode, a high voltage may be induced between the second node 52 and the third node 53 at high transmit power levels with the transistor Q5 activated. The value of the capacitor C5 is chosen in such a way to be minimal while referenced to the drain-source capacitance of the transistor Q5 in the activated state. Again, this is understood to create a voltage divider that reduces the voltage swing across the transistor Q5. In light of these factors, the size of the transistor Q5 is selected.

In the receive mode, the low noise amplifier 108 and the transistor Q2 thereof is activated, while the power amplifier 106 and the transistor Q1 thereof are deactivated. Along with the transistor Q2, the RF switching transistors Q3 and Q4 are activated, while the RF switching transistor Q5 is deactivated. As indicated above, with the RF switching transistors Q3 and Q4 turned on, the respective resonance circuits are activated to define a parallel resonance and a corresponding resonance resistance in the operating frequency band. With the transistor Q5 deactivated in the receive mode, a substantially high impedance is exhibited by the same. The features and configuration of the first resonant circuit 142 and the second resonant circuit 144 are the same as discussed above in relation to the second embodiment of the front end circuit 100b, and so will not be repeated. Along these lines, the features and configuration of the input matching circuit for the low noise amplifier 108 are also the same as discussed above in relation to the second embodiment of the front end circuit 100b, and likewise will not be repeated.

Figure 17:
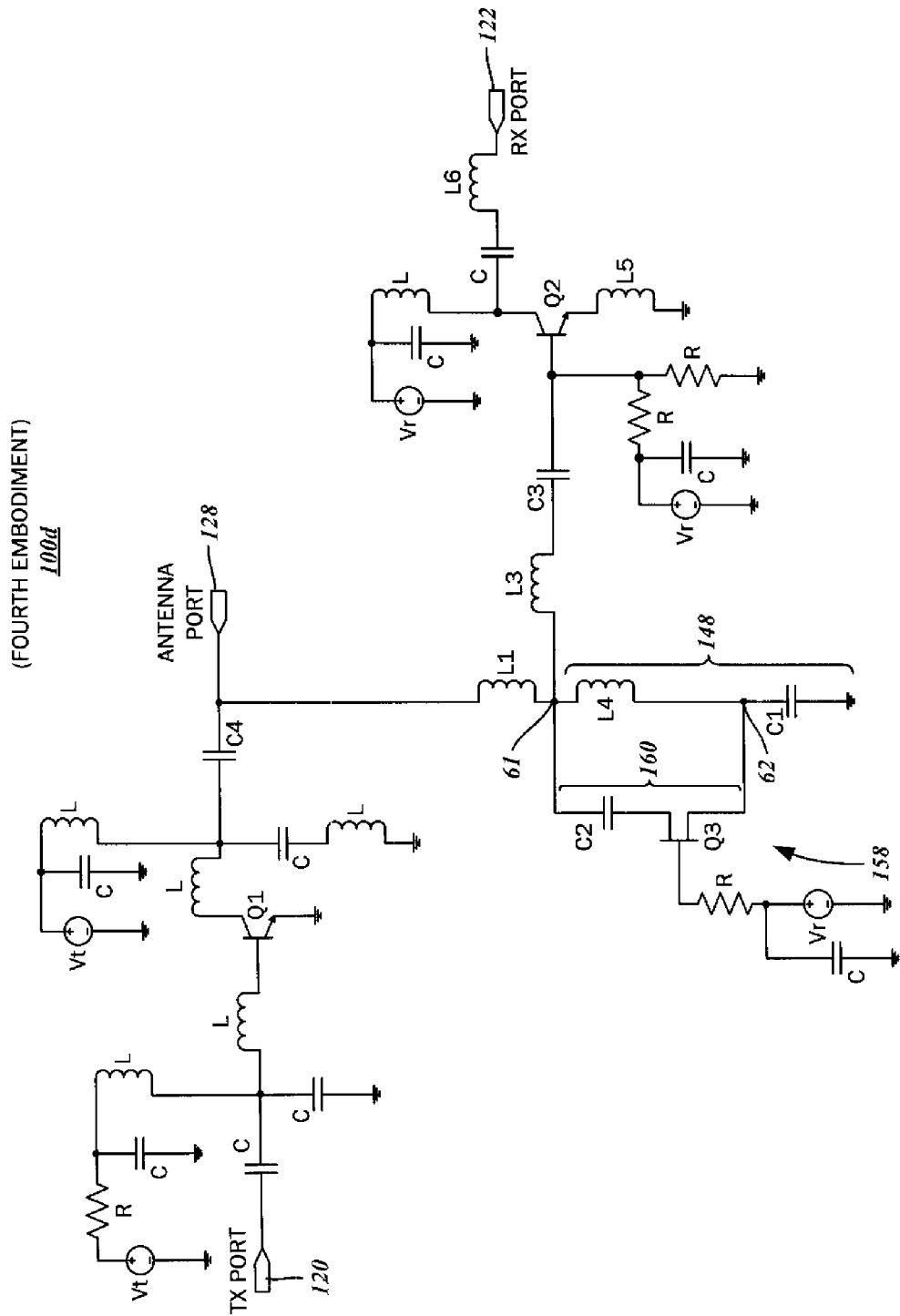
FIG. 17 is a schematic diagram of a fourth embodiment of the front end circuit.

A fourth embodiment of the front end circuit 100d is shown in FIG. 17. This embodiment is similar to the second embodiment of the front end circuit 100b, though there is only one parallel resonant circuit with one RF switch. Again, like the other embodiments of the front end circuit 100 described above, the transistor Q1 generally corresponds to the power amplifier 106, and is in a common-emitter configuration with a single amplification stage. Similarly, the transistor Q2 generally corresponds to the low noise amplifier 108, and is also in a common-emitter configuration with a single amplification stage. The various control circuits, the input and output matching circuits for the power amplifier 106, and the output matching circuit for the low noise amplifier 108 are as discussed above in relation to the other embodiments.

An alternative first resonant circuit 158 is contemplated for the matching and switch network 130 with a corresponding RF switching transistor Q3. A field effect transistor is shown in FIG. 17, though any other type of transistor may be substituted. The alternative first resonant circuit 158 is connected to the inductor L1, which is connected to the output of the power amplifier 106 and the antenna port 128. The junction at which the inductor L1 is connected to the alternative first resonant circuit 158 is referred to as an alternative first node 61.

In the transmit mode, the transistor Q1 that corresponds to the power amplifier 106 is activated, while the transistor Q2 that corresponds to the low noise amplifier 108 is deactivated. Furthermore, the RF switching transistor Q3 is also deactivated, and there is a substantially high impedance between the drain and source terminals, with the gate-source control voltage being below a predetermined threshold level. In this state, the series resonance 148 defined by the capacitor C1 and the inductor L4 in the operating frequency band with the transistor Q3 deactivated provides a low resistive pass to ground, which may be less than 3 Ohms. The inductance and capacitance values are selected to achieve the same, and the junction between the capacitor C1 and the inductor L4 is referred to as the alternative second node 62. The series resonance feature is understood to minimize the influence of the base-emitter impedance of the low noise amplifier transistor Q2 in a deactivated state and the transmit signal loss associated therewith. Furthermore, the values of the inductor L3 and the capacitor C3 are selected to minimize the voltage swing at the base-emitter junction of the transistor Q2 with the power amplifier 106 activated with a large signal on the antenna port 128.

Along these lines, the size/geometry of the transistor Q2 is selected such that the base-emitter impedance thereof is maximized in the deactivated state, or at least greater than the resonant resistance of the series resonance 148 defined by the capacitor C1 and the inductor L4 so that the transmit performance does not depend upon the transistor Q2 being connected.

A high voltage may be induced between the alternative first node 61 and the alternative second node 62 at high transmit power levels with the transistor Q3 deactivated. The value of the capacitor C2 is chosen in such a way to be minimal while referenced to the drain-source capacitance of the transistor Q3 in the deactivated state. Again, this is understood to create a voltage divider that reduces the voltage swing across the transistor Q3. In light of these factors, the size of the transistor Q3 is selected. To ensure transmit performance, the antenna 102 is impedance matched to the power amplifier.

In the receive mode, the low noise amplifier 108 and the transistor Q2 thereof is activated, while the power amplifier 106 and the transistor Q1 thereof are deactivated. Along with the transistor Q2, the RF switching transistor Q3 is activated. With the RF switching transistor Q3 turned on, the corresponding alternative first resonant circuit 158 is activated to define the alternative first parallel resonance 160 in the operating frequency band with the inductor L4 and the capacitor C2. The values of the transistor resistance of Q3, along with those of the inductor L4 and the capacitor C2 are selected to maximize the resonant resistance between the alternative first node 61 and the alternative second node 62, preferably, though optionally greater than 100 Ohms. At the same time, the size/geometry of the transistor Q3, along with the biasing conditions thereof, are selected to minimize its resistive loss when activated. This resistive loss is contemplated to be less than 10 Ohms.

Proper impedance matching of the low noise amplifier 108 to the antenna 102 involves the inductor L3, the capacitor C3, as well as the inductor L5. The input matching (S11) is envisioned to be less than −10 dB. The value of the inductor L3 and the capacitor C3 are selected to minimize the noise figure of the low noise amplifier 108. In one embodiment, a noise figure of less than 3 dB is contemplated. In addition to impedance matching, the capacitor C3 is understood to be a direct current (DC) block.

Additional configuration limits of the size/geometry of the transistor Q2 beyond those specific to the transmit mode described above include setting the base-emitter impedance in the activated state to be substantially low. One limit is envisioned to be less than 50 Ohms. At the same time, the geometry of the transistor Q2 and its biasing conditions are selected to be high enough when activated, at greater than 10 Ohms, such that the losses associated with the input matching circuit have a lower effect on the noise figure of the low noise amplifier 108.

Figure 18:
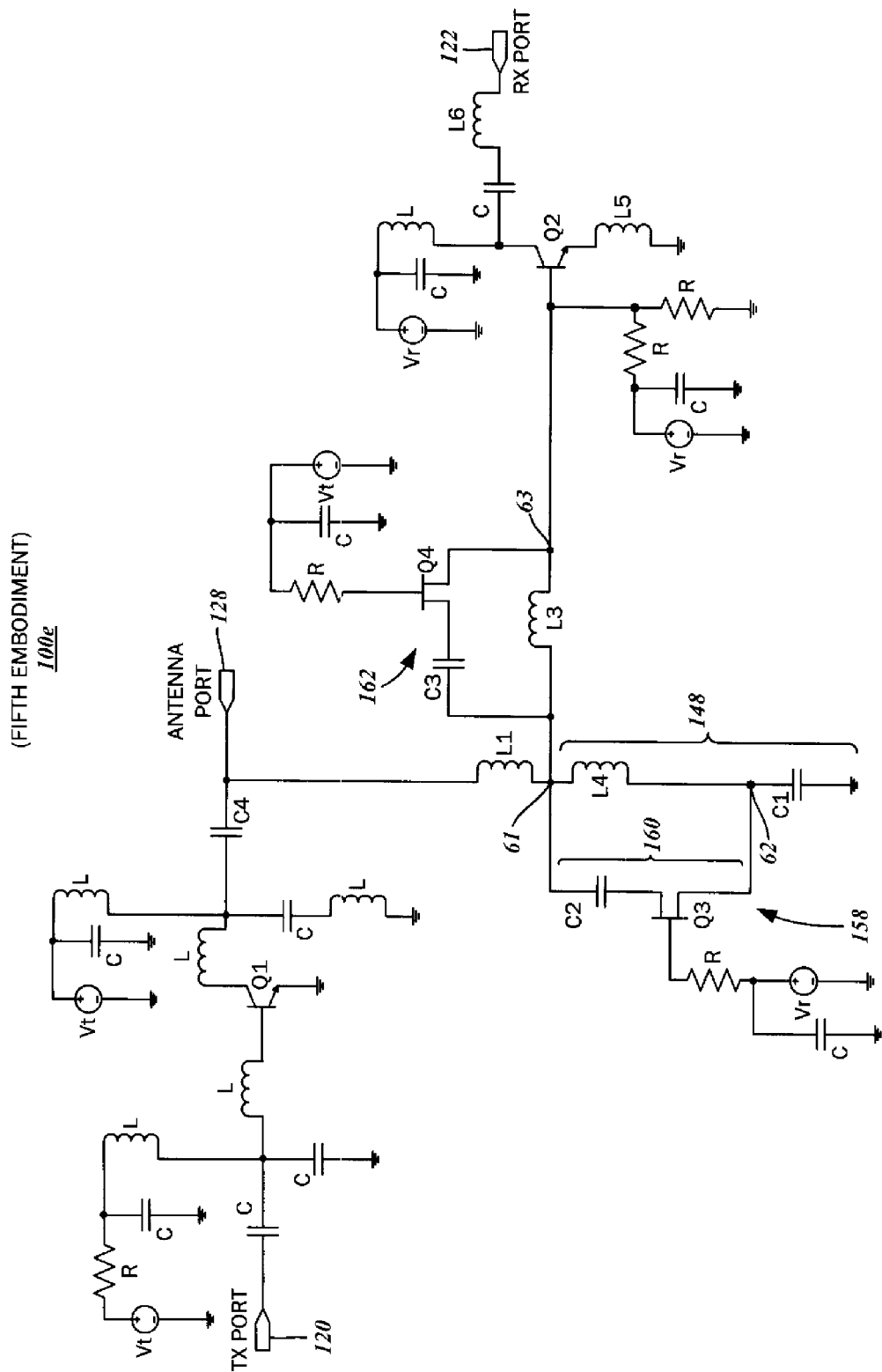
FIG. 18 is a schematic diagram of a fifth embodiment of the front end circuit.

FIG. 18 shows a fifth embodiment of the front end circuit 100e, which is similar to the fourth embodiment of the front end circuit 100d described above with reference to FIG. 17. In addition to the previously noted features, the fifth embodiment of the front end circuit 100e includes an additional non-resonant circuit, the details of which will be described with greater particularity below. Generally, as with the other embodiments of the front end circuit 100, and in particular with the fourth embodiment of the front end circuit 100e, the transistor Q1 corresponds to the power amplifier 106, and is in a common-emitter configuration with a single amplification stage. Similarly, the transistor Q2 generally corresponds to the low noise amplifier 108, and also is in a common-emitter configuration with a single amplification stage. The various control circuits, the input and output matching circuits for the power amplifier 106, and the output matching circuit for the low noise amplifier 108 are as discussed above in relation to the other embodiments.

The output of the power amplifier 106 is connected to an antenna port 128. Also connected to the antenna port 128 is the inductor L1. Again, the junction between the inductor L1 and the alternative first resonant circuit 158 is referred to as the alternative first node 61. A first non-resonant circuit 162 is connected in parallel to the inductor L3, with one segment being connected to the alternative first node 61, and the other segment being connected to an alternative third node 63.

In the transmit mode, the transistor Q1 is activated, while the transistor Q2 is deactivated. Furthermore, the RF switching transistor Q3 is also deactivated, and there is a substantially high impedance between the drain and source terminals, with the gate-source control voltage being below a predetermined threshold level. In this state, the series resonance 148 defined by the capacitor C1 and the inductor L4 in the operating frequency band with the transistor Q3 deactivated provides a low resistive pass to ground, which may be less than 3 Ohms. The inductance and capacitance values are selected to achieve the same, and the junction between the capacitor C1 and the inductor L4 is referred to as the alternative second node 62. The series resonance feature is understood to minimize the influence of the base-emitter impedance of the low noise amplifier transistor Q2 in a deactivated state and the transmit signal loss associated therewith. Furthermore, the values of the inductor L3 and the capacitor C3 are selected to minimize the voltage swing at the base-emitter junction of the transistor Q2 with the power amplifier 106 activated with a large signal on the antenna port 128. The size/geometry of the transistor Q2 and its biasing conditions are selected such that the base-emitter impedance thereof is substantially low when activated. To ensure transmit performance, the antenna 102 is impedance matched to the power amplifier.

A transistor Q4 of the first non-resonant circuit 162 is activated during the transmit mode, with the values of the inductor L3 and the capacitor C3 being selected to maximize the negative imaginary impedance between the alternative first node 61 and the alternative second node 62. In particular, a parallel resonant circuit below the operating frequency band is defined thereby. According to one contemplated embodiment, the imaginary negative impedance is less than −j 150 Ohms. It is contemplated that a voltage divider between the alternative first node 61 and ground results, meaning that the voltage swing between the base of the low noise amplifier transistor Q2 and ground is reduced, as well as minimizing the influence of the low noise amplifier 108 on transmit signal performance.

In the receive mode, the low noise amplifier transistor Q2 is activated, while the power amplifier transistor Q1 is deactivated. Along with the transistor Q2, the RF switching transistor Q3 is activated. With the RF switching transistor Q3 turned on, the corresponding alternative first resonant circuit 158 is activated to define the alternative first parallel resonance 160 in the operating frequency band with the inductor L4 and the capacitor C2. The values of the transistor resistance of Q3, along with those of the inductor L4 and the capacitor C2 are selected to maximize the resonant resistance between the alternative first node 61 and the alternative second node 62, preferably, though optionally greater than 100 Ohms. At the same time, the size/geometry of the transistor Q3, along with the biasing conditions thereof, are selected to minimize its resistive loss when activated. This resistive loss is contemplated to be less than 10 Ohms.

Again, proper impedance matching of the low noise amplifier 108 to the antenna 102 in the receive mode involves the inductors L1 and L3, as well as the inductor L5. The input matching (S11) is envisioned to be less than −10 dB when the low noise amplifier transistor Q2 is turned on. The value of the inductors L1 and L3 are selected to minimize the noise figure of the low noise amplifier 108. In one embodiment, a noise figure of less than 3 dB is contemplated. In addition to impedance matching, the capacitor C3 is understood to be a direct current (DC) block.

Figure 19:
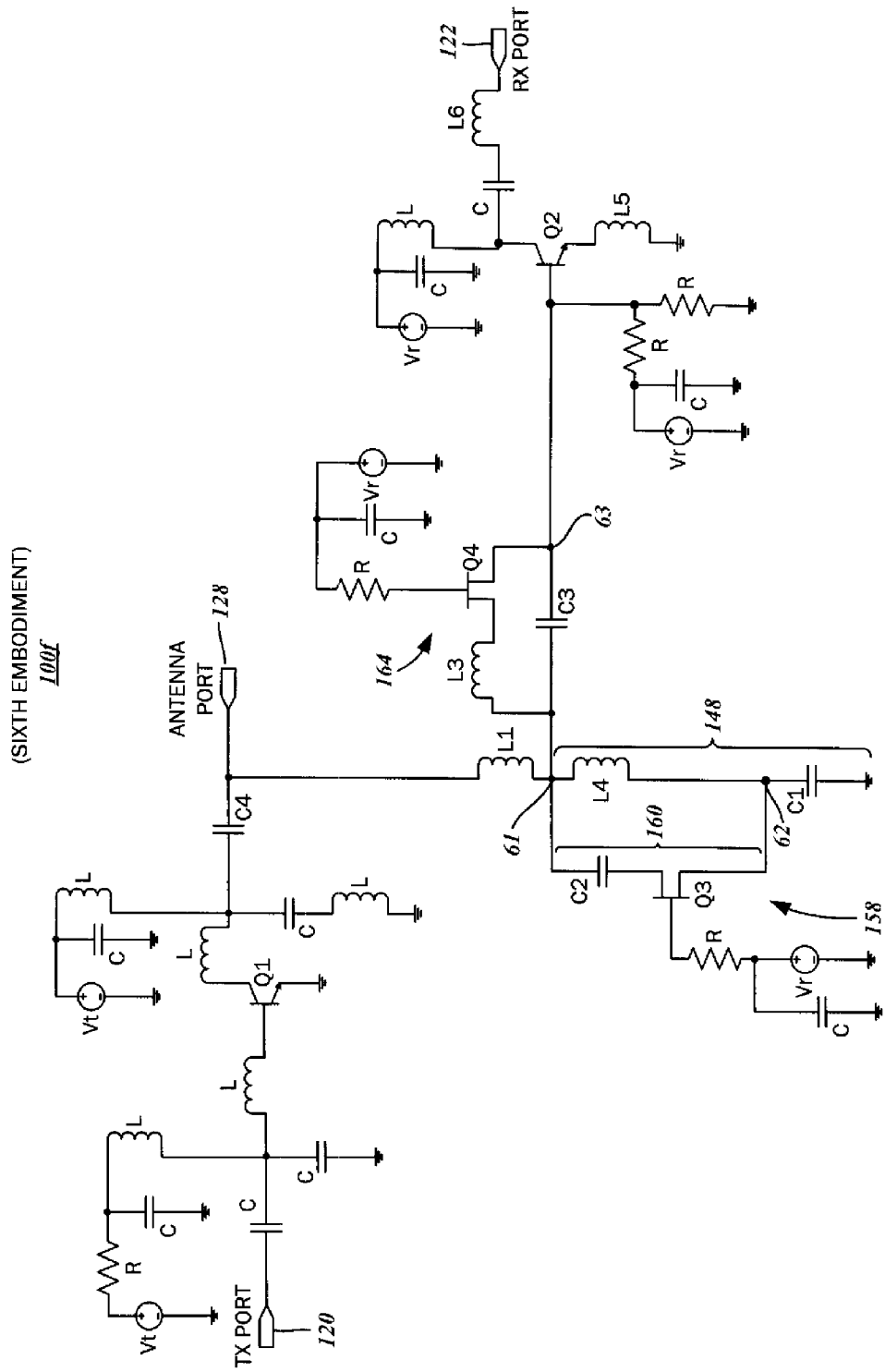
FIG. 19 is a schematic diagram of a sixth embodiment of the front end circuit.

FIG. 19 shows a sixth embodiment of the front end circuit 100f, which is similar to the fifth embodiment of the front end circuit 100e described above with reference to FIG. 18. The sixth embodiment of the front end circuit 100f similarly includes an additional non-resonant circuit, the details of which will be described more fully below. Generally, as with the other embodiments of the front end circuit 100, the transistor Q1 corresponds to the power amplifier 106, and is in a common-emitter configuration with a single amplification stage. Similarly, the transistor Q2 generally corresponds to the low noise amplifier 108, and also is in a common-emitter configuration with a single amplification stage. The various control circuits, the input and output matching circuits for the power amplifier 106, and the output matching circuit for the low noise amplifier 108 are as discussed above in relation to the other embodiments.

The output of the power amplifier 106 is connected to an antenna port 128. Also connected to the antenna port 128 is the inductor L1. Again, the junction between the inductor L1 and the alternative first resonant circuit 158 is referred to as the alternative first node 61. A second non-resonant circuit 164 is connected in parallel to the capacitor C3, with one segment being connected to the alternative first node 61, and the other segment being connected to an alternative third node 63.

In the transmit mode, the transistor Q1 is activated, while the transistor Q2 is deactivated. Furthermore, the RF switching transistor Q3 is also deactivated, and there is a substantially high impedance between the drain and source terminals, with the gate-source control voltage being below a predetermined threshold level. In this state, the series resonance 148 defined by the capacitor C1 and the inductor L4 in the operating frequency band with the transistor Q3 deactivated provides a low resistive pass to ground, which may be less than 3 Ohms. The inductance and capacitance values are selected to achieve the same, and the junction between the capacitor C1 and the inductor L4 is referred to as the alternative second node 62. The series resonance feature is understood to minimize the influence of the base-emitter impedance of the low noise amplifier transistor Q2 in a deactivated state and the transmit signal loss associated therewith. Furthermore, the values of the inductor L3 and the capacitor C3 are selected to minimize the voltage swing at the base-emitter junction of the transistor Q2 with the power amplifier 106 activated with a large signal on the antenna port 128. The size/geometry of the transistor Q2 and its biasing conditions are selected such that the base-emitter impedance thereof is substantially low when activated. To ensure transmit performance, the antenna 102 is impedance matched to the power amplifier.

The transistor Q4 of the second non-resonant circuit 164 is also deactivated during the transmit mode. The value of the capacitor C3 thereof is selected to achieve a substantially high negative imaginary impedance between the alternative first node 61 and the alternative second node 62. According to one contemplated embodiment, the imaginary negative impedance is less than –j 150 Ohms. It is contemplated that a voltage divider between the alternative first node 61 and ground results, meaning that the voltage swing between the base of the low noise amplifier transistor Q2 and ground is reduced, as well as minimizing the influence of the low noise amplifier 108.

In the receive mode, the low noise amplifier transistor Q2 is activated, while the power amplifier transistor Q1 is deactivated. Along with the transistor Q2, the RF switching transistors Q3 and Q4 are activated. With the RF switching transistor Q3 turned on, the corresponding alternative first resonant circuit 158 is activated to define the alternative first parallel resonance 160 in the operating frequency band with the inductor L4 and the capacitor C2. The values of the transistor resistance of Q3, along with those of the inductor L4 and the capacitor C2 are selected to maximize the resonant resistance between the alternative first node 61 and the alternative second node 62, preferably, though optionally greater than 100 Ohms. At the same time, the size/geometry of the transistor Q3, along with the biasing conditions thereof, are selected to minimize its resistive loss when activated. This resistive loss is contemplated to be less than 10 Ohms.

Again, proper impedance matching of the low noise amplifier 108 to the antenna 102 involves the inductors L1 and L3, as well as the inductor L5. The input matching (S11) is envisioned to be less than –10 dB when the low noise amplifier transistor Q2 is turned on. The value of the inductors L1 and L3 are selected to minimize the noise figure of the low noise amplifier 108. In one embodiment, a noise figure of less than 3 dB is contemplated. In addition to impedance matching, the capacitor C3 is understood to be a direct current (DC) block.

Figure 20:
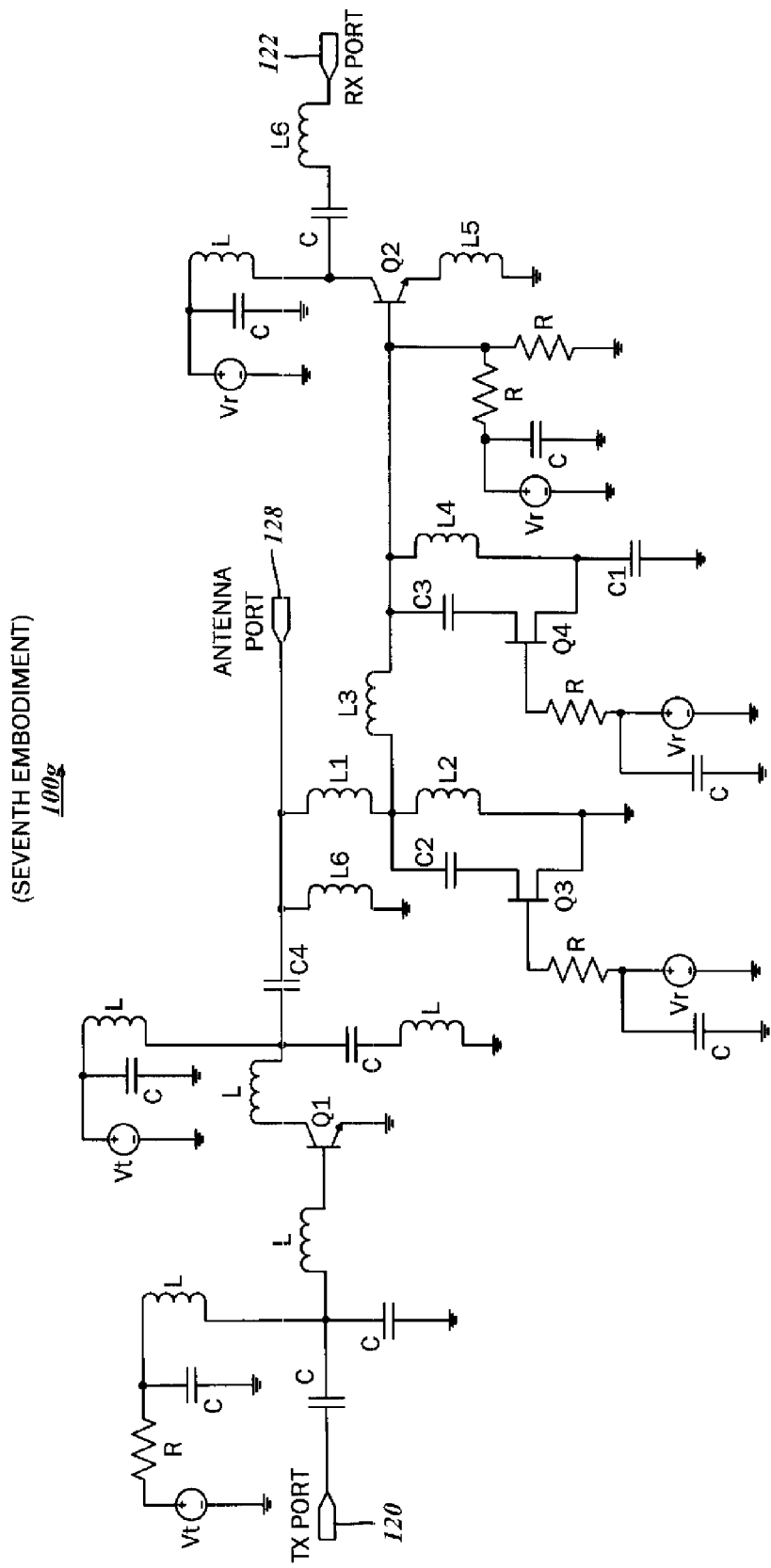
FIG. 20 is a schematic diagram of a seventh embodiment of the front end circuit including an additional matching inductor.
Figure 21:
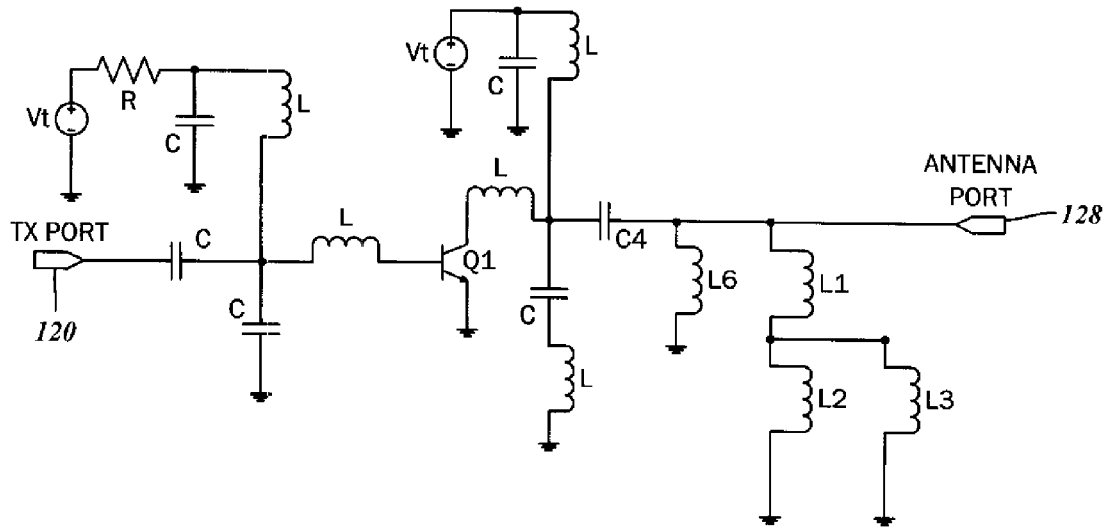
FIG. 21 is a schematic diagram of a simplified equivalent circuit of the seventh embodiment of the front end circuit shown in FIG. 20 in a transmit mode.

Referring now to FIG. 20, a seventh embodiment of the front end circuit 100g is most all respects identical to that of the second embodiment of the front end circuit 100b, with the addition of the inductor L6 to the first node 51. The various other features of the seventh embodiment have been considered above in relation to the second embodiment, and will not be repeated. A simplified equivalent circuit of the seventh embodiment of the front end circuit 100g is shown in FIG. 21, with the addition of the inductor L6 as previously indicated. The equivalent inductance connected to the antenna 102 is given by L6//(L1+L2*L3/(L2+L3)), however, to account for this addition.

Figure 22:
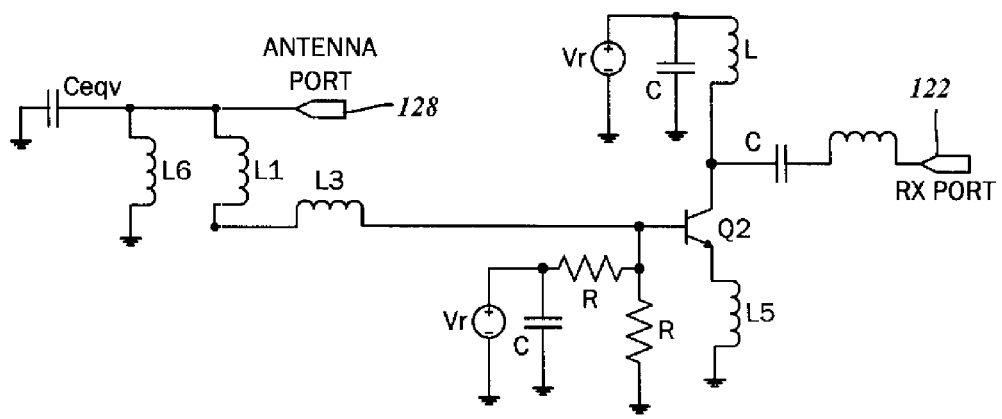
FIG. 22 is a schematic diagram of a simplified equivalent circuit of the seventh embodiment of the front end circuit shown in FIG. 20 in a receive mode.

FIG. 22 illustrates a simplified equivalent circuit of the seventh embodiment of the front end circuit 100g in the receive mode. The capacitor Ceqv is understood to represent a typical capacitive impedance in the operating frequency band for the power amplifier output matching circuit and the collector-emitter impedance of the power amplifier transistor Q1 in the deactivated stage. This capacitance, together with the inductors L6, L3 and L1 represent the impedance matching circuit between the antenna 102 and the base-emitter impedance of the low noise amplifier transistor Q2 in an activated state. As mentioned above, the inductor L5 tied to the emitter of the low noise amplifier transistor Q2 further aids in the impedance matching to the antenna 102.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention with more particularity than is necessary for the fundamental understanding of the present invention, the description taken with the drawings making apparent to those skilled in the art how the several forms of the present invention may be embodied in practice.

What is claimed is:

1. A front end circuit for coupling an antenna to a first radio frequency (RF) transceiver, the RF transceiver being defined by an operating frequency band and including a signal input and a signal output, the front end circuit comprising:
    an antenna port connectible to the antenna;
    a transmit port connectible to the signal output of the RF transceiver;
    a receive port connectible to the signal input of the RF transceiver;
    a power amplifier including an input and an output, the input being coupled to the transmit port;
    a low noise amplifier including an input and an output, the output being coupled to the receive port; and
    a switching network interconnecting the output of the power amplifier, the input of the low noise amplifier, and the antenna port, the switching network including:
        a first resonant circuit with a first switching transistor defining a first parallel resonance with a first resonant resistance in the operating frequency band upon activation of the first switching transistor, and a substantially high transistor impedance upon deactivation of the first switching transistor, the first resonant circuit including a series resonance segment having a low impedance in the operating frequency band;
        a second resonant circuit with a second switching transistor defining a second parallel resonance with a second resonance resistance in the operating frequency band upon activation of the second switching transistor, and a substantially high transistor impedance upon deactivation of the second switching transistor; and
        a third resonant circuit with a third switching transistor defining a third parallel resonance with a third resonance resistance in the operating frequency band upon activation of the third switching transistor, and a substantially high transistor impedance upon deactivation of the third switching transistor.

2. The front end circuit of claim 1, wherein the switching network includes:
    a first network node with the antenna port, the third resonant circuit, and a first inductor connected thereto;
    a second network node with the first inductor, the second resonant circuit, and a third inductor connected thereto;
    a third network node with the input of the low noise amplifier, the third inductor, and the first resonant circuit connected thereto;
    a fourth network node defined by the series resonant segment of the first resonant circuit; and
    a fifth network node with the output of the power amplifier and the third resonant circuit connected thereto.

3. The front end circuit of claim 2, wherein the values of the first inductor, the second inductor, and the third inductor are selected to correspond to predefined power amplifier performance parameters.

4. The front end circuit of claim 2, wherein a voltage divider is defined between the first node, the first inductor, the second node, and the second inductor with the second switching transistor deactivated in the transmit mode.

5. The front end circuit of claim 2, wherein the low noise amplifier, the first switching transistor, the second switching transistor, and the third switching transistor are deactivated in the transmit mode, and activated in the receive mode.

6. The front end circuit of claim 1, wherein the first switching transistor, the second switching transistor, and the third switching transistor are field effect transistors.

7. A front end circuit for coupling an antenna to a radio frequency (RF) transceiver, the RF transceiver being defined by an operating frequency band and including a signal input and a signal output, the front end circuit comprising:
- an antenna port connectible to the antenna;
- a transmit port connectible to the signal output of the RF transceiver;
- a receive port connectible to the signal input of the RF transceiver;
- a power amplifier including an input and an output, the input being coupled to the transmit port;
- a low noise amplifier including an input and an output, the output being coupled to the receive port; and
- a switching network interconnecting the output of the power amplifier, the input of the low noise amplifier, and the antenna port, the switching network including a first resonant circuit with a first switching transistor defining a first parallel resonance with a first resonant resistance in the operating frequency band upon activation of the first switching transistor, and a substantially high impedance upon deactivation of the first switching transistor, the first resonant circuit including a series resonance segment having a low impedance in the operating frequency band;
- wherein the resistive part of an input impedance of the low noise amplifier is matched to an impedance of the antenna and set independently of an output impedance of the power amplifier.

8. The front end circuit of claim 7, wherein the switching network includes:
- a first network node with the first resonant circuit connected thereto;
- a second network node connected to the input of the low noise amplifier;
- an antenna matching inductor connected to the antenna port and the first network node.

9. The front end circuit of claim 8, wherein the switching network includes:
- a low noise amplifier matching inductor connected to the first network node and in series with the low noise amplifier; and
- a low noise amplifier matching capacitor connected to the low noise amplifier matching inductor and in series with the low noise amplifier to the second network node.

10. The front end circuit of claim 8, wherein the switching network includes:
- a low noise amplifier matching inductor connected to the first network node and in series with the low noise amplifier to the second network node;
- a non-resonant circuit connected in parallel to the low noise amplifier matching inductor from the first network node to the second network node, the non-resonant circuit being activated in the transmit mode and deactivated in the receive mode.

11. The front end circuit of claim 8, wherein the switching network includes:
- a low noise amplifier matching capacitor connected to the first network node and in series with the low noise amplifier to the second network node;
- a non-resonant circuit connected in parallel to the low noise amplifier matching capacitor from the first network node to the second network node, the non-resonant circuit being activated in the transmit mode and deactivated in the receive mode.

12. The front end circuit of claim 7, wherein the switching network includes:
- a second resonant circuit with a second switching transistor defining a second parallel resonance with a second resonance resistance in the operating frequency band upon activation of the second switching transistor, and a substantially high transistor impedance upon deactivation of the second switching transistor.

13. The front end circuit of claim 12, wherein the switching network includes:
- a first network node with the antenna port, the output of the power amplifier, and a first inductor connected thereto;
- a second network node with the first inductor, the second resonant circuit, and a third inductor connected thereto;
- a third network node with the input of the low noise amplifier, the third inductor, and the first resonant circuit connected thereto; and
- a fourth network node defined by the series resonant segment of the first resonant circuit.

14. The front end circuit of claim 13, wherein the values of the first inductor, the second inductor, and the third inductor correspond to predefined power amplifier performance parameters.

15. The front end circuit of claim 13, wherein a voltage divider is defined between the first node, the first inductor, the second node, and the second inductor with the second switching transistor deactivated in the transmit mode.

16. The front end circuit of claim 13, wherein the low noise amplifier, the first switching transistor, and the second switching transistor are deactivated in the transmit mode, and activated in the receive mode.

17. The front end circuit of claim 12, wherein the switching network includes:
- a third resonant circuit with a third switching transistor defining a third parallel resonance with a third resonance resistance in the operating frequency band upon activation of the third switching transistor, and a substantially high transistor impedance upon deactivation of the third switching transistor.

18. The front end circuit of claim 7, further comprising:
- a matching inductor connected to the output of the power amplifier.

* * * * *